(12) United States Patent
Kathpalia et al.

(10) Patent No.: US 11,742,553 B1
(45) Date of Patent: Aug. 29, 2023

(54) BATTERY CELL WELDING MASK

(71) Applicant: Rivian IP Holdings, LLC, Plymouth, MI (US)

(72) Inventors: Bharat Kathpalia, San Francisco, CA (US); Bryce Fredrick Alexander Beecher, Bloomington, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/056,974

(22) Filed: Nov. 18, 2022

(51) Int. Cl.
*H01M 50/516* (2021.01)
*H01M 50/566* (2021.01)
(52) U.S. Cl.
CPC ....... *H01M 50/516* (2021.01); *H01M 50/566* (2021.01)
(58) Field of Classification Search
CPC .......................... H01M 50/516; H01M 50/566
See application file for complete search history.

(56) References Cited

U.S. PATENT DOCUMENTS

2021/0344083 A1* 11/2021 Kim ...................... H01M 50/50

FOREIGN PATENT DOCUMENTS

CN          217788488 U  * 11/2022

OTHER PUBLICATIONS

CN217788488U translation (Year: 2022).*

* cited by examiner

*Primary Examiner* — Jane J Rhee
(74) *Attorney, Agent, or Firm* — Foley & Lardner LLP

(57) ABSTRACT

An apparatus is provided. The apparatus can include plate including an opening. The apparatus can include a clamp to couple a battery cell with the plate with a terminal of a cell of the battery module at least partially exposed through the opening. The apparatus can include a spring positioned with the clamp and the plate, the spring to cause the clamp to align the battery cell with a current collector.

18 Claims, 28 Drawing Sheets

1900

BATTERY CELL WELDING MASK

INTRODUCTION

A vehicle, such as an electric vehicle, can be powered by batteries to reduce greenhouse gas emissions. The batteries can include multiple battery cells that can be welded to current collectors.

SUMMARY

This disclosure is generally directed to a solution for decreasing the cycle time for a submodule laser welding process for a battery pack of an electric vehicle. Welding battery cells that can power electric vehicles can be a time-consuming process, particularly when the battery there are a large number of battery cells that need to be welded to current collectors. The process can be time-consuming because the areas that need to be welded on the terminals of the battery cells can be small. To overcome these challenges, a mask can be configured to clamp the battery cells of to current collectors prior to welding any current collectors to the battery cells. The mask can include a plate with one or more openings. Battery cells and current collectors can be placed between the openings such that terminals of the battery cells and the current collectors are at least partially exposed through the openings. Springs between the clamps and the plate can bias the clamps to clamp the battery cells to the current collectors. Accordingly, a welding device welding the battery cells and current collectors can weld the battery cells and current collectors through the openings while the battery cells and current collectors remain in substantially the same positions. Thus, the welding device can accurately and consistently weld the components together.

At least one aspect is directed to an apparatus. The apparatus can include a plate comprising one or more openings. The apparatus can include a plurality of clamps to couple a battery module to the plate with a terminal of each of a plurality of cells of the battery module exposed through an opening of the one or more openings. The apparatus can include a plurality of springs between the plurality of clamps and the plate, the plurality of springs to bias the plurality of clamps to clamp the plurality of cells to a plurality of current collectors.

At least one aspect is directed to an apparatus. The apparatus can include a plate comprising an opening. The apparatus can include a clamp to couple a battery module to the plate with a terminal of a cell of the battery module exposed through the opening. The apparatus can include a spring between the clamp and the plate, the spring to bias the clamp to clamp the battery cell to a current collector.

At least one aspect is directed to an apparatus. The apparatus can include a plate comprising an opening. The apparatus can include a clamp to couple a battery cell with the plate, wherein a terminal for the battery cell is at least partially exposed through the opening. The apparatus can include a spring positioned with the clamp and the plate, the spring to cause the clamp to align the battery cell with a current collector.

At least one aspect is directed to a method. The method can include providing a plate comprising an opening. The method can include providing a clamp to couple a battery cell with the plate, wherein a terminal of the battery cell is at least partially exposed with the opening. The method can include causing, with a spring positioned with the clamp and the plate, the clamp to align the battery cell with a current collector.

At least one aspect is directed to a method. The method can include providing a plate comprising one or more openings. The method can include coupling, with a plurality of clamps, a battery module to the plate such that a terminal of each of a plurality of cells of the battery module is exposed through an opening of the one or more openings. The method can include biasing, with a plurality of springs between the plurality of clamps and the plate, the plurality of clamps to clamp the plurality of cells to a plurality of current collectors.

At least one aspect is directed to a method. The method can include providing a plate comprising an opening. The method can include coupling, with a clamp, a battery module to the plate such that a terminal of a cell of the battery module is exposed through the opening. The method can include biasing, with a spring between the clamp and the plate, the clamp to clamp the cell to a current collector.

At least one aspect is directed to an apparatus. The apparatus can include a plurality of plates comprising a plurality of openings and coupled with a board. The apparatus can include a plurality of clamps coupling a battery module to the plurality of plates such that a terminal of each of a plurality of cells of the battery module is observable through an opening of the plurality of openings. The plurality of clamps can clamp the plurality of cells to a plurality of current collectors.

At least one aspect is directed to an apparatus. The apparatus can include a plate comprising an opening. The apparatus can include a clamp to couple a battery cell with the plate and a current collector with a terminal for the battery cell, wherein the terminal for the battery cell is at least partially exposed through the opening. The apparatus can include a laser to micro-weld the current collector with the terminal for the battery cell through the opening.

At least one aspect is directed to an apparatus. The apparatus can include a plurality of plates comprising an opening and coupled with a board. The apparatus can include a clamp to couple a battery cell to at least one of the plurality of plates, wherein a terminal of the battery cell is at least partially exposed through the opening, wherein the clamp clamps the battery cell to a current collector.

At least one aspect is directed to a method. The method can include providing a plate comprising an opening. The method can include providing a clamp to couple a battery cell with the plate and a current collector with a terminal for the battery cell, wherein the terminal for the battery cell is at least partially exposed through the opening. The method can include providing a laser to micro-weld the current collector with the terminal for the battery cell through the opening.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
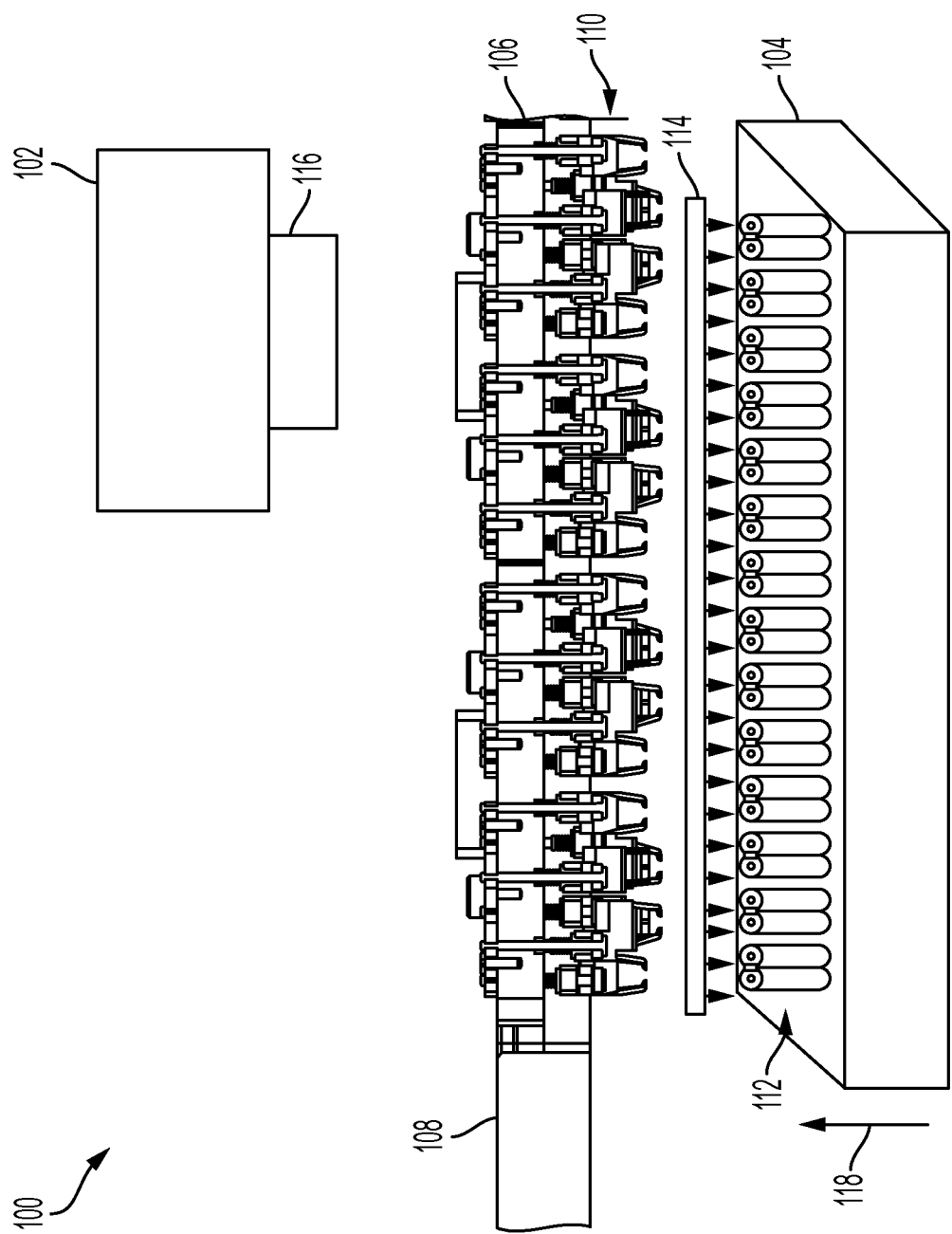
FIG. 1 depicts an illustration of a welding device welding battery cells coupled with a plate, in accordance with present implementations.

Following below are more detailed descriptions of various concepts related to, and implementations of, methods, apparatuses, and systems of welding battery cells. The various concepts introduced above and discussed in greater detail below may be implemented in any of numerous ways.

This disclosure is generally directed to a technical solution to decrease the cycle time for a laser welding process for a battery pack of an electric vehicle. A battery pack created through the laser welding process can operate an electric vehicle and reduce greenhouse emissions relative to an internal combustion engine. Creating battery packs that can power electric vehicles can be a time-consuming process, particularly when the battery pack has a large number of battery cells that need to be welded to current collectors. The process can be time-consuming because the areas that need to be welded on the terminals of the battery cells can be small, thereby potentially requiring high precision in micro welding the terminals. Identifying the right portions of the welds can require time to help ensure the correct areas of the battery cells and current collectors are welded together. The amount of time that is required to weld can increase when a welding device (e.g., a laser welding device that micro welds segments on portions of the battery cell, such as a negative terminal on the shoulder of the battery cell) welding the battery cell terminals to current collectors takes the time to move from a first battery cell to a second battery cell, and so on. Such a device can move in the x and y-direction, among a combination of such directions, to identify the next battery cells to weld the terminals to current collectors. The laser welding system can then move in the z-direction to clamp the battery cells to the current collectors to improve the accuracy of the welding and help ensure the current collectors and battery cells are being welded at the precise locations. Moving in the z-direction for each weld can require a large amount of time when the number of battery cells exceeds 400 battery cells, which can be common with battery cells that are designed to power electric vehicles.

To solve these and other technical challenges, a mask described herein can be configured to clamp the battery cells to current collectors prior to the welding process. The mask can include a plate with one or more openings. Clamps can be coupled with a bottom surface of the plate. The mask can be positioned such that the one or more openings provide access to battery cells and current collectors, where the laser welding system can move to the openings in the clamps such that terminals of the battery cells and the current collectors are accessible through the openings. Springs between (e.g., positioned with) the clamps and the plate can bias (e.g., force or apply pressure to) the clamps to clamp the battery cells to the current collectors. The clamps can clamp two battery cells in triplets such that one clamp of the triplet clamps the negative terminals from both battery cells to a negative current collector and the other two clamps of the triplet clamp the positive terminals to respective positive current collectors. By being configured in this manner, the battery cells and current collectors can be securely fastened or clamped to or with the mask prior to welding any current collectors to battery cells such that the battery cells and current collectors can be welded without any further clamping by the welding device. Accordingly, a welding device welding the battery cells and current collectors can weld the battery cells and current collectors without moving in the z-direction to clamp the battery cells and current collectors together, thus substantially speeding up the battery manufacturing process.

To account for the large number of battery cells that can be in a set of battery cells (e.g., a battery module) for an electric vehicle, a mask can include multiple plates that are adjacently coupled with a board. Battery cells and current collectors can be similarly clamped in the openings of the plates. A welding device can then weld the clamped battery cells and current collectors clamped with each plate in a single sequence. Using a mask in this way can substantially reduce the time taken to weld the battery cells and current collectors together because the welding device can weld more battery cells to current collectors in a single sequence, thus minimizing the number of times the battery cells and current collectors need to be replaced during the welding process.

FIG. 1 depicts a side view of a system 100 for welding battery cells together. As described herein, the system 100 can be an apparatus. The system 100 can include a welding device 102, a battery module 104, a plate 106, and a board 108. The plate 106 can be coupled with the board 108. Any number of the plates 106 can be coupled with the board 108. Clamps 110 can be coupled to or with the plate 106. The battery module 104 can include one or more battery cells 112. The battery module 104 and the one or more battery cells 112 can be the same as or similar to the battery module 2115 and the battery cells 2120, shown and described with reference to FIGS. 21-22E. Current collectors can overlay the battery cells 112. The clamps 110 can receive the battery cells 112 and current collectors and clamp the battery cells 112 to the current collectors. Clamping the battery cells 112 with the current collectors can align the current collectors with specific portions of the battery cells 112 (e.g., cause current collectors to overlay specific portions of the battery cells 112). While clamped, the welding device 102 can direct a laser 116 at the current collectors on the battery cells 112. Thus, the plate 106, the board 108, and the clamps 110 can operate as a welding mask to facilitate welding of battery cells.

The battery module 104 can include one or more rows of battery cells 112. The rows of battery cells can be separated by barrier sheets. The barrier sheet can electrically isolate the battery cells from each other. The edges of the battery module 104 can include walls that electrically isolate the battery cells 112 positioned with the battery module 104 from objects that contact the outside of the battery module 104. The battery cells 112 can be held in place by a cell carrier that fits around the individual battery cells. In some cases, the battery cells 112 can be grouped together outside of a barrier module (e.g., outside of a container with barriers between the battery cells 112). Welding battery cells 112 outside of a battery module can be useful for welding battery cells in a cell-to-pack configuration in which battery modules are not used.

A current collector assembly 114 can overlay the battery cells 112. The current collector assembly 114 can include current collectors that overlay defined portions of the battery cells 112. For example, when overlaid on the battery cells 112, the current collectors of the current collector assembly 114 can be positioned over specific terminals of the battery cells 112. Positive current collectors can overlay positive terminals of the battery cells 112. Negative current collectors can overlay negative terminals of the battery cells 112. The positive current collectors can be or include one type of metal (e.g., aluminum) and be welded to positive terminals of battery cells. The negative current collectors can be or include the same type of metal to the positive current collectors or a different type of metal from the positive current collectors (e.g., copper) and be welded to negative terminals of the battery cells 112. Using different metals for the positive and negative current collectors can reduce corrosion in the current collectors. The positive and negative current collectors can each include any type of metal. Accordingly, when the current collectors of the current collector assembly 114 are welded to the terminals of battery cells 112, the current collectors can be welded to conduct electricity between battery cells and can do so while reducing corrosion on the current collectors.

The battery cells 112 can be moved or forced in an upwards direction 118 to clamp the battery cells 112 to the current collectors of the current collector assembly 114 with the clamps 110. For example, the battery cells 112 (e.g., the battery cells within the battery module 104) can lie on a platform. The platform can be raised (e.g., raised by a controller that transmits a control signal to a device controlling the platform) to cause the clamps 110 to clamp the battery cells 112 to the current collectors overlaying the battery cells 112 in place.

The battery cells 112 can be clamped together in pairs in a peanut configuration. For example, pairs of the battery cells 112 can be clamped together by triplets of the clamps 110. One clamp of the triplet of clamps 110 can clamp a positive current collector with a positive terminal of one battery cell of a pair in the peanut configuration. Another clamp of the triplet of clamps 110 can clamp another positive current collector to a positive terminal of the other battery cell of the pair in the peanut configuration. A third clamp of the triplet of clamps 110 can clamp a negative current collector (e.g., a single negative current collector) to negative terminals of both battery cells of the pair of battery cells in the peanut configuration. Accordingly, the battery cells 112 can be clamped in pairs to be welded together at the negative terminals of the battery cells 112.

In operation, the battery cells 112 can be lifted or forced in the upwards direction 118 from a position below the plate 106. The clamps 110 can receive the battery cells 112 and clamp the current collectors of the current collector assembly 114 overlaying the battery cells 112 to the corresponding terminals of the battery cells 112. The welding device 102 can direct the laser 116 to the current collectors on the battery cells 112 to weld the current collectors to the terminals of the battery cells 112.

The clamps 110 and the plate 106 can clamp the battery cells 112 in other configurations. For example, the clamps 110 can be coupled with or to a top surface of the plate 106 such that the battery cells 112 are clamped with the current collectors above the plate 106. The laser 116 can weld (e.g., micro-weld) the current collectors to the clamped battery cells 112 and current collectors in this position. In this example, the plate 106 may or may not include any openings as the laser 116 can directly weld the clamped battery cells 112 and current collectors. In another example, the clamps 110 can clamp (e.g., directly clamp) the plate 106 to or with the battery cells 112. For instance, the clamps 110 can clamp the plate 106 from the side while holding the battery cells 112 in place under the plate 106 such that the battery cells 112 are forced against or touching portions of the plate 106. The clamps 110 can hold the plate 106 or the battery cells 112 in various arrangements.

Figure 2:
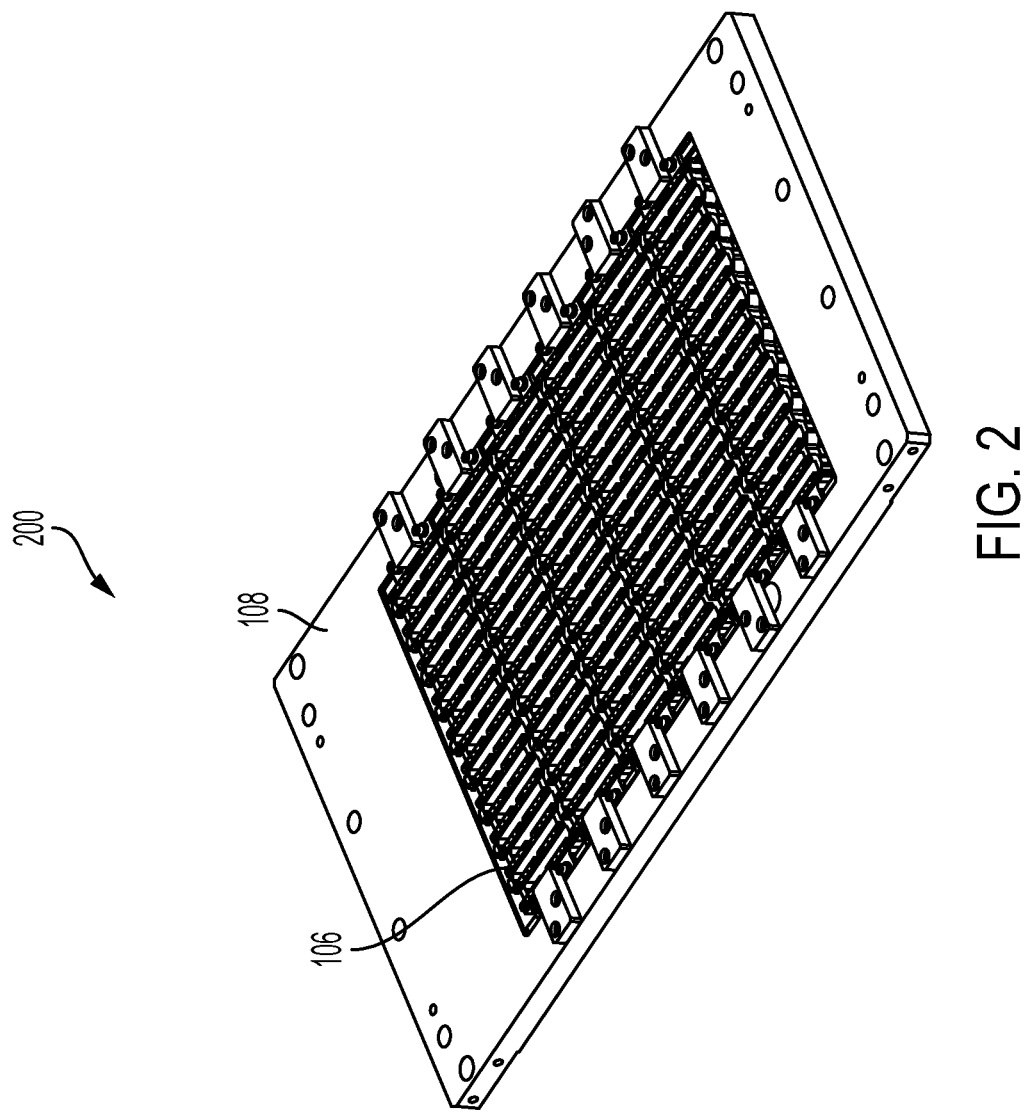
FIG. 2 depicts a perspective view of multiple plates coupled with a board, in accordance with present implementations.

FIG. 2 depicts a perspective view 200 of multiple plates 106 coupled with a board 108, in accordance with present implementations. For example, as illustrated, the board 108 can include a space (e.g., an opening) in the middle of the board. The plates 106 can be placed within the space. The plates 106 can be placed within the space adjacent to each other such that the battery cells 112 can be sized to include spaced apart (e.g., evenly spaced apart) battery cells that can be coupled to or with clamps coupled with a bottom surface of the plates 106.

By placing multiple plates 106 in the space of the board 108, battery cells can be welded to current collectors more quickly. For example, a welding device can be configured to weld current collectors to battery cells of a battery module that includes 432 battery cells (or any other number of battery cells) through the plates 106 in the space of the board 108. If only one plate is within the space of the board 108, the welding device may not be able to weld each battery cell of the battery module without the battery module being adjusted or repositioned underneath the plate. However, if the board 108 has a space large enough to contain multiple plates or multiple plates are included within the space of the board 108, the welding device can weld each of the 432 cells of the battery module without such adjustments. Accordingly, including multiple plates within the space of a board can increase the speed of welding battery cells over time.

Figure 3:
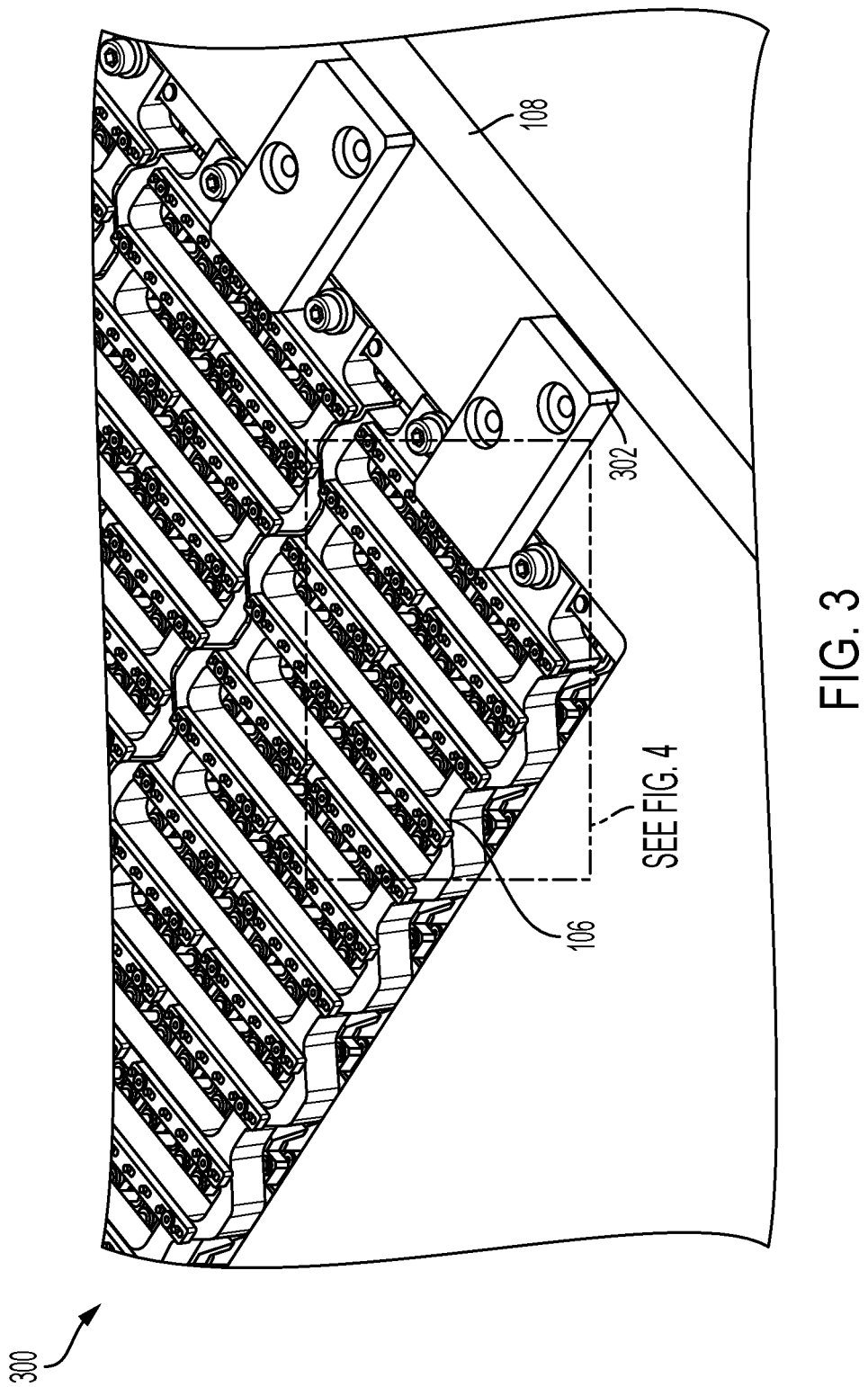
FIG. 3 depicts a perspective view of a flange of a plate coupled with a board, in accordance with present implementations.

FIG. 3 depicts a perspective view of a flange 302 of the plate 106 coupled with a board 306, in accordance with present implementations. The plate 106 and the board 108 can be the same as or similar to the plate 106 and the board 108, shown and described with reference to FIG. 1. The flange 302 can be a part of or fastened to a top surface of the board 108. The flange 302 can lay flush against a top surface of the board 108. The flange 302 can be fastened to the board 108 with a fastener (e.g., a nail, a screw, or a bolt). Although not shown in FIG. 3, the opposing side of the plate 106 can include a flange that can be fastened to the board 108 in a similar manner. The remaining portions of the plate 106 can remain within a space of the board 108. Accordingly, the plate 106 can be fastened to the board 108 while lying flat within the space of the board 108.

Figure 4:
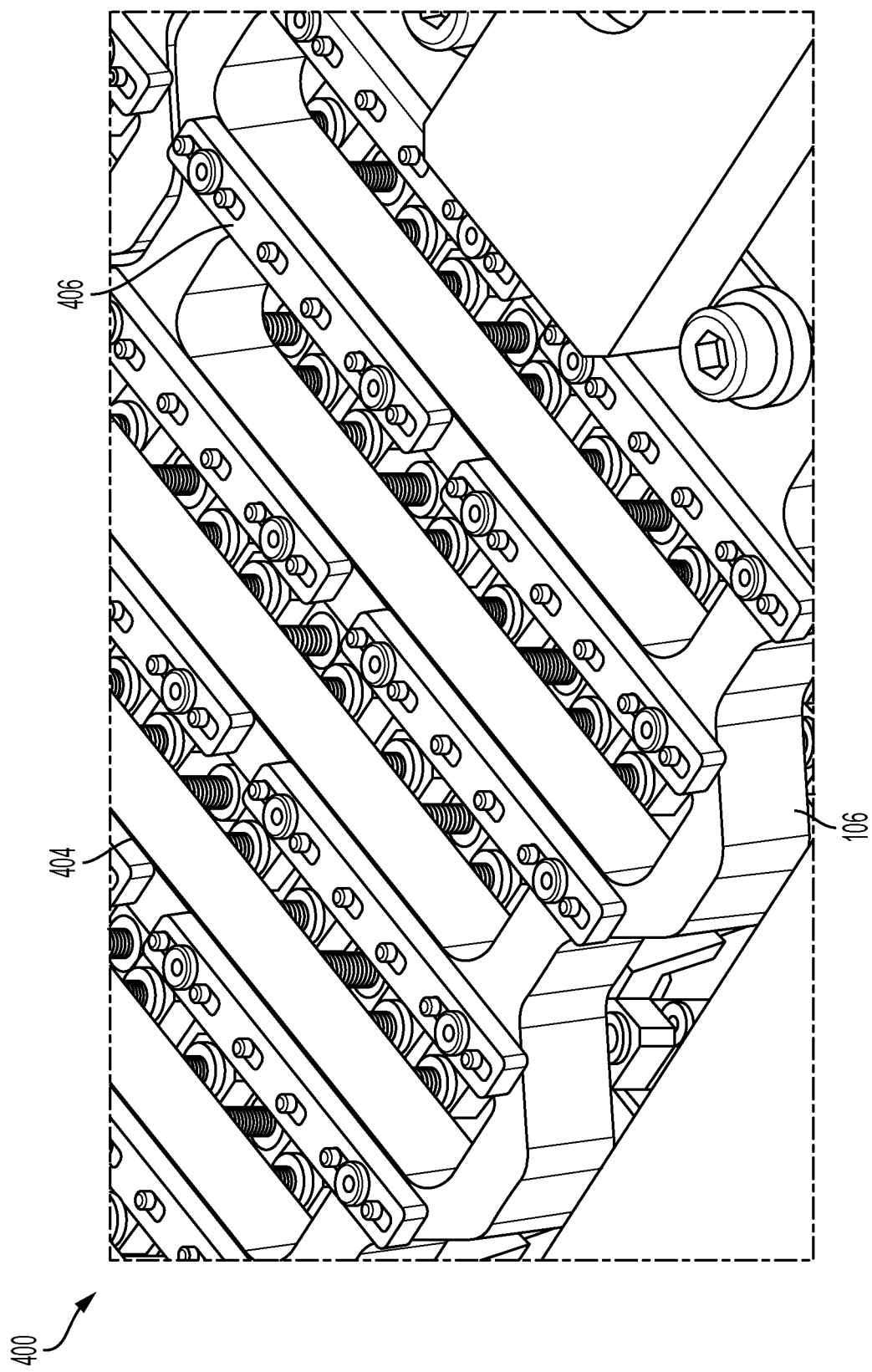
FIG. 4 depicts a perspective view of a top surface of a plate, in accordance with present implementations.

FIG. 4 depicts a perspective view 400 of a top surface of a plate 106, in accordance with present implementations. As illustrated, the plate 106 can include openings 404 and fastening assemblies 406. The openings 404 can be evenly spaced or sized within the plate 106. The openings 404 can be in parallel with each other (e.g., in a straight line) within the plate 106 or at angled positions from each other. The openings 404 can be configured to facilitate laser welding of clamped battery cells by an overhead laser welding device. The openings 404 can do so by making terminals of battery cells clamped beneath the openings accessible. For example, clamps can clamp current collectors to battery cells beneath the plate 106. While clamped, the current collectors can be exposed or observable to an overhead laser welding device through the openings 404. Accordingly, the overhead laser welding device can direct a laser through the openings 404 to weld the exposed current collectors to the battery cells while the clamps maintain the position (e.g., substantially maintain the position, such as within a 0.5 millimeter radius) of the current collectors on the battery cells.

The fastening assemblies 406 can each be assemblies that are configured to facilitate coupling of clamps to the plate 106. The fastening assemblies 406 can be or include pin retaining bars. The fastening assembly can be or include metal (e.g., aluminum, iron, copper, or steel) or plastic. The fastening assemblies 406 can operate or be the same as or similar to a C-clip and can be configured to receive and hold multiple pin (e.g., six pins). For example, clamps can be coupled with a bottom surface of the plate 106 with pins that have flanges on both ends. The pins can pass through holders of the clamps and the plate 106. The pins can also pass through the fastening assemblies 406. The flanges on the pins can rest or press against the holders on the clamps and the fastening assemblies 406, thus coupling the clamps to the plate 106.

Figure 5:
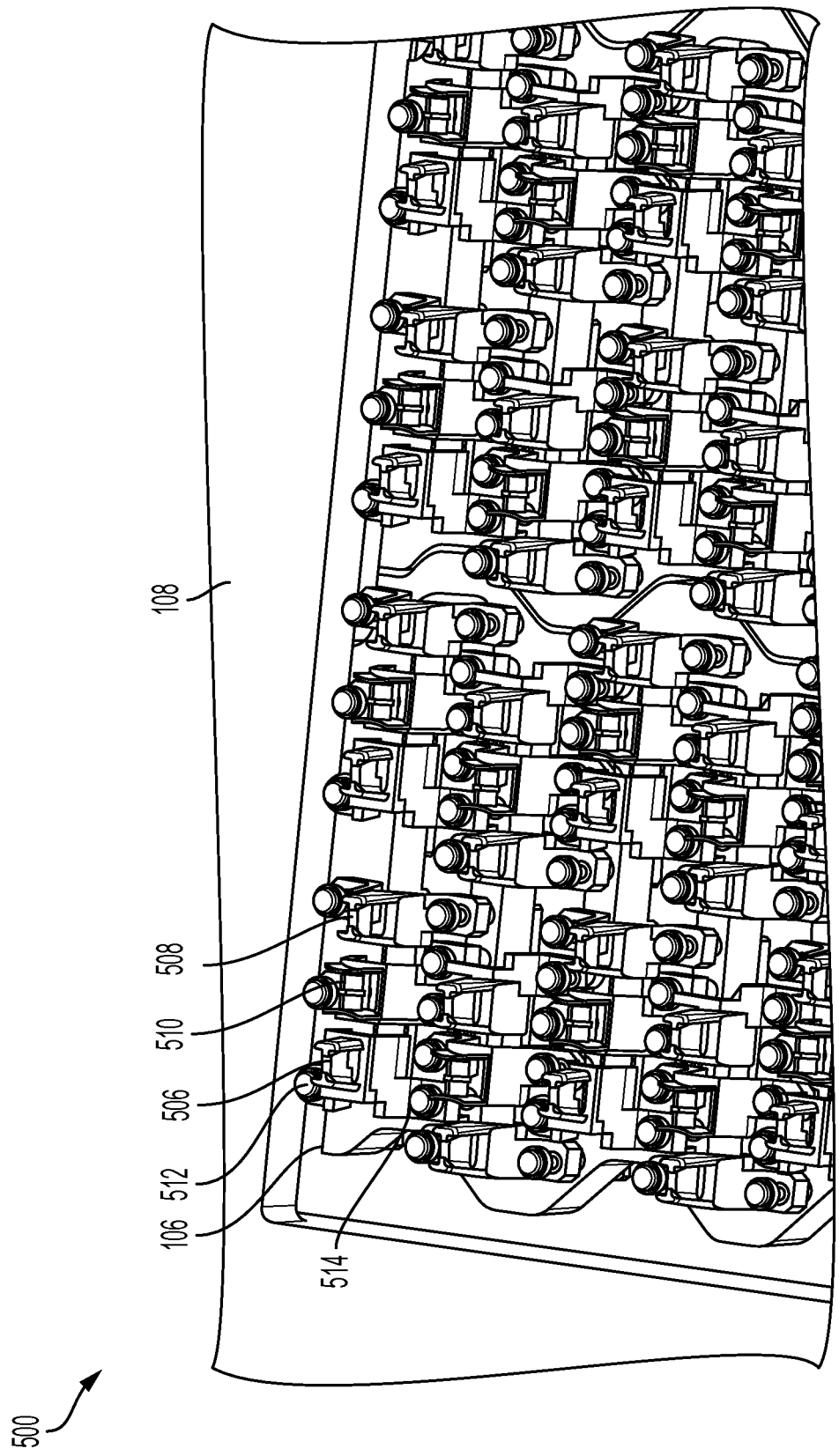
FIG. 5 depicts a perspective view of plates coupled with a bottom surface of a board, in accordance with present implementations.

FIG. 5 depicts a perspective view 500 of a bottom surface of the board 108 coupled with plates 106, in accordance with present implementations. In the perspective view 500, clamps are coupled with the plates 106 in triplets. Each triplet can be configured to clamp a pair of battery cells in a peanut configuration to current collectors. For example, clamps 506, 508, and 510 can be coupled with the plate 106. The clamps 506, 508, and 510 can be coupled with the plate 106 through pins 512. The clamp 506 can be configured to clamp a positive current collector to a positive terminal of a battery cell of the pair of battery cells. The clamp 508 can be configured to clamp a positive current collector (e.g., a different positive current collector) to a positive terminal of the other battery cell of the pair of battery cells. The clamp 510 can be configured to clamp a negative current collector to negative terminals of both of the pair of battery cells. Clamps can similarly clamp pairs of battery cells to current collectors in such a triplet configuration for any number of pairs of battery cells.

The clamps coupled to or with the plates 106 can be configured in a "V-shape." For example, each clamp can have two legs. The two legs can extend away from each other. The legs can be connected by a platform that is coupled or that extends from each of the two legs towards the other leg. The legs of a clamp can be coupled to or with a plate 106 by separate pins 512 and 514 that each couple a different leg of the clamp to the plate 106. The legs of the clamp can extend towards opposing sides of an opening in the plate 106 such that the platform of the clamp is exposed through the opening. The platform can include a space such that an image capturing device (e.g., a camera or a video camera) of a welding device can capture images the area directly beneath the clamp through the opening of the plate 106 and the clamp. Each clamp that is coupled to or with the plates 106 can be configured and coupled to or with the plates 106 in the same or a similar manner. Accordingly, when the clamps clamp battery cells to current collectors, the current collectors can be exposed through the openings in the plates 106 and the openings in the platforms of the clamps for a welding device to weld the current collectors to the battery cells.

Figure 6:
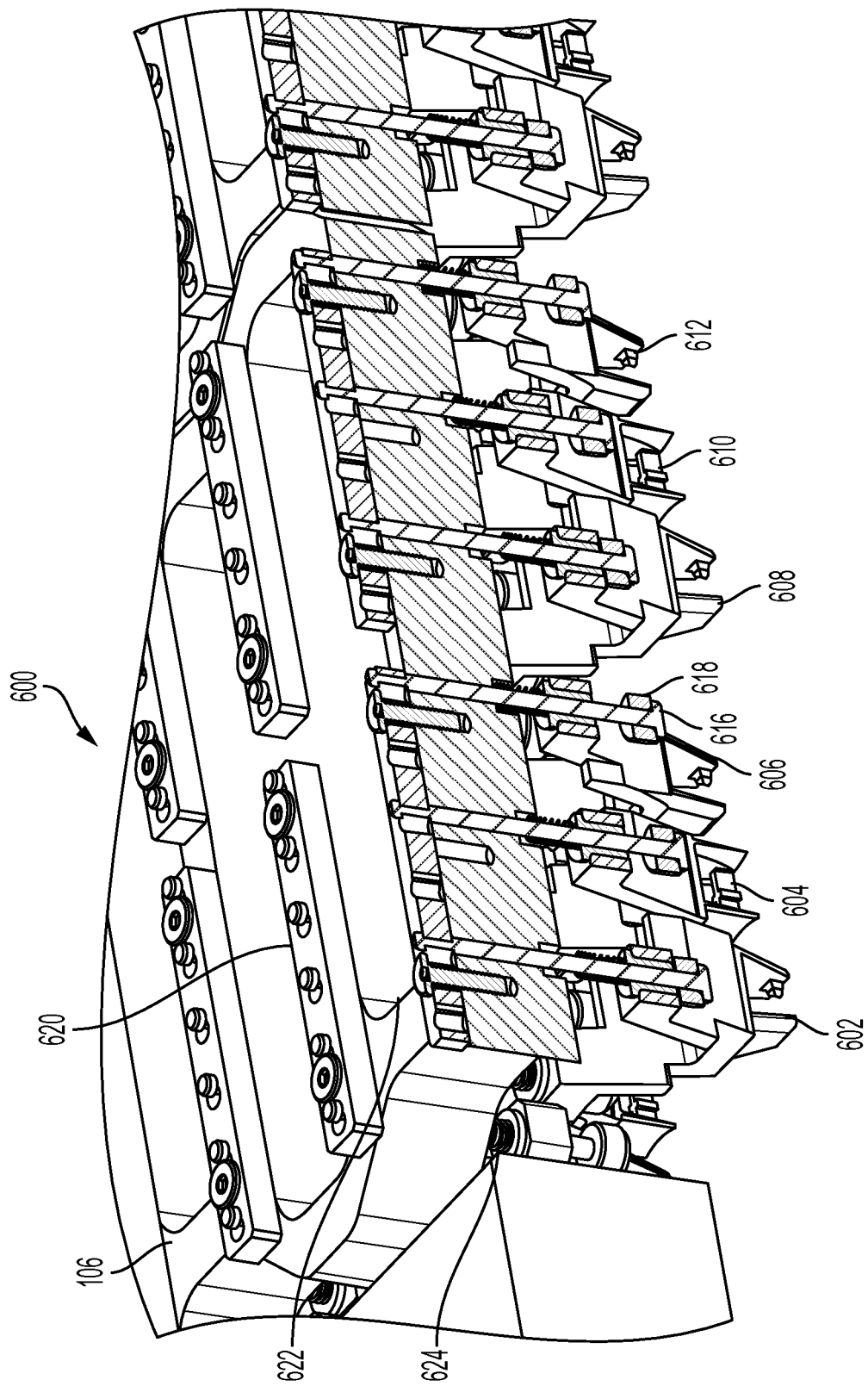
FIG. 6 depicts a perspective view of clamps coupled with a plate, in accordance with present implementations.

FIG. 6 depicts a perspective view 600 of clamps 602-612 coupled with the plate 106, in accordance with present implementations. Clamps 602-612 and the plate 106 can be the same as or similar to the clamps 110 or the clamps 506-510, shown and described with reference to FIGS. 1 and 5, respectively. Any number of clamps similar to clamps 602-612 can be coupled to or with the plate 614. The clamps 602-612 can be coupled to or with the plate 106 in triplets. For example, clamps 602 and 608 can be or include clamps configured to clamp positive current collectors to positive terminals of separate first battery cells. Clamps 604 and 610 can be clamps configured to clamp a negative current collector (e.g., a single negative current collector) to negative terminals of both the first battery cell and a second battery cell. Clamps 606 and 612 can each be or include clamps configured to clamp positive current collectors to positive terminals of the separate second battery cells. The clamps 602-612 can be configured to clamp battery cells to current collectors such that a welding device can weld the current collectors to the battery cells.

The clamps 602-612 can be coupled with the plate 106 via pins 616, holders 618, and fastening assemblies 620. The pins 616 can each pass through the plate 106, the holders 618, and the fastening assemblies 620 to couple the clamps 602-612 with the plate 106. For example, the holders 618 can be individually coupled or fastened to the clamps 602-612 (e.g., coupled with a screw or nail or as a part of the clamps 602-612 that extend from sides of the legs of the clamps 602-612). The fastening assemblies 620 can be fastened to the plate via screws or nails. The pins 616 can pass through the holders 618 and the fastening assemblies 620. Flanges of the pins 616 can extend perpendicular to the pins 616 at opposing sides of the pins 616. The flanges can rest or provide force against the holders 618 and the fastening assemblies 620. The pins 616, the holders 618, and the fastening assemblies 620 can be similarly configured on both sides of an opening 622 in the plate 106 such that both legs of each of the clamps 602-612 can be coupled with the plate 106 at opposing sides of the opening 622.

Springs 624 can be configured to clamp battery cells with current collectors between clamps 602-612. For example, the pins 616 can each pass through the springs 624 in addition to the clamps 602-612 and the plate 106. The springs 624 can each be positioned between the legs of the clamps 602-612 and the plate 106. For each clamp, a spring 624 can be positioned between each leg of the clamp and the plate 106 such that the spring 624 contacts (e.g., directly contacts) the leg of the clamp and the plate 106. When battery cells and current collectors are pressed into the clamps 602-612, the clamps 602-612 can force against the springs 624, compressing the springs 624 into the plate 106. When force stops being applied to the clamps 602-612, the springs 624 can decompress, biasing the clamps 602-612 away from the plate 106. The decompression can cause the clamps 602-612 to clamp the current collectors and battery cells together and align the battery cell with the current collector. Decompressing the springs can bias the clamp in a direction away from the plate. For example, decompressing the springs can bias the clamp at an angle from the plate, such as, but not limited to, an acute angle, a right angle (e.g., perpendicular from the plate), an obtuse angle, among other angles. When in the decompressed state, the springs 624 can apply six Newtons of force per spring, for example, to the legs of the clamps 602-612.

Figure 7:
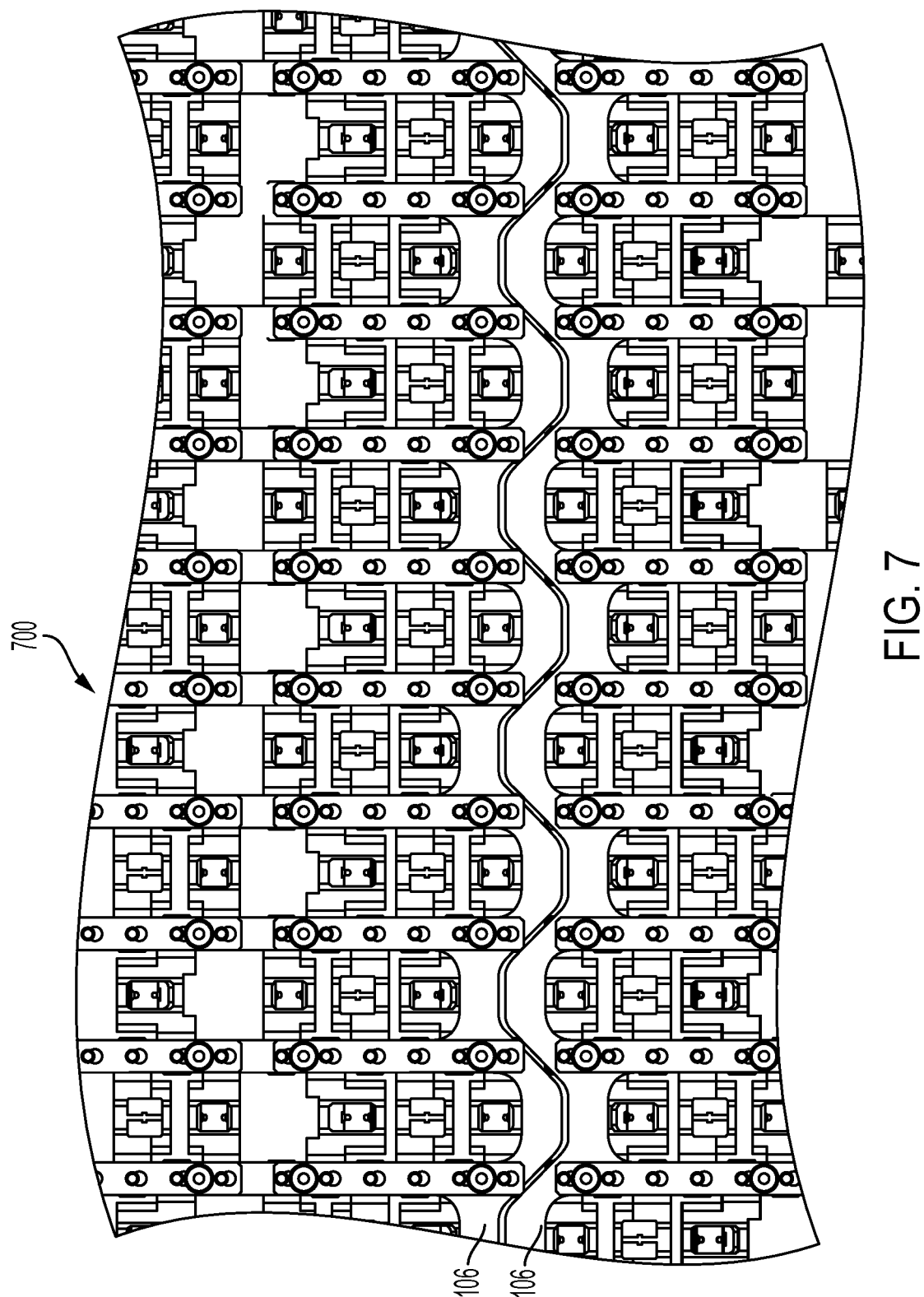
FIG. 7 depicts an overhead view of clamps coupled with plates, in accordance with present implementations.

FIG. 7 depicts an overhead view 700 of plates 106 coupled with clamps, in accordance with present implementations. The clamps can be coupled to or with bottom sides of the plates 106. The clamps can be coupled to or with the bottom sides of the plates 106 in triplets. Each triplet can be configured to clamp two battery cells to current collectors (e.g., separate positive current collectors and a common negative current collector between the two battery cells). The two battery cells and the current collectors can be exposed through openings in the plates 106.

Figure 8:
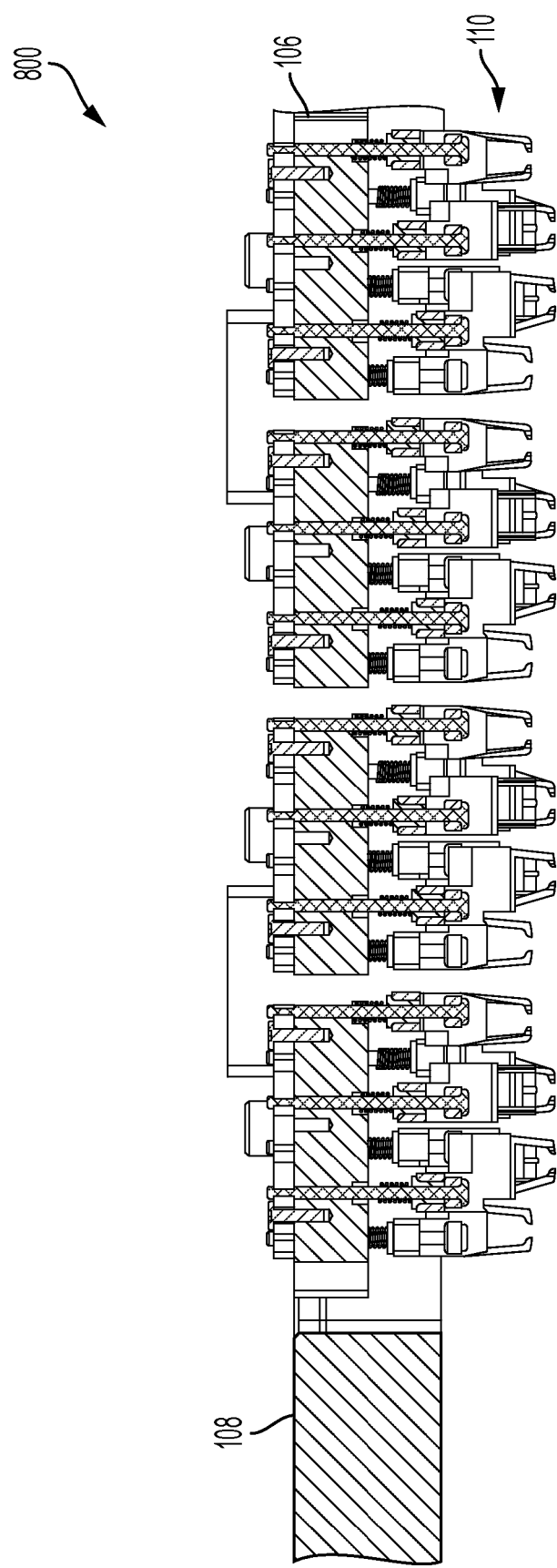
FIG. 8 depicts a side view of clamps coupled with a plate, in accordance with present implementations.

FIG. 8 depicts a side view 800 of the clamps 110 coupled with the plate 106, in accordance with present implementations. The plate 106 can be coupled with the board 108. The clamps 110 can be coupled with the plate 106 via pins that pass through holders attached to or a part of the clamps 110. The pins can pass through springs that contact the plate 106 and the clamps 110. The springs can be configured to bias the clamps away from the plate 106 to clamp current collectors to battery cells (e.g., battery cells of a battery module).

Figure 9A:
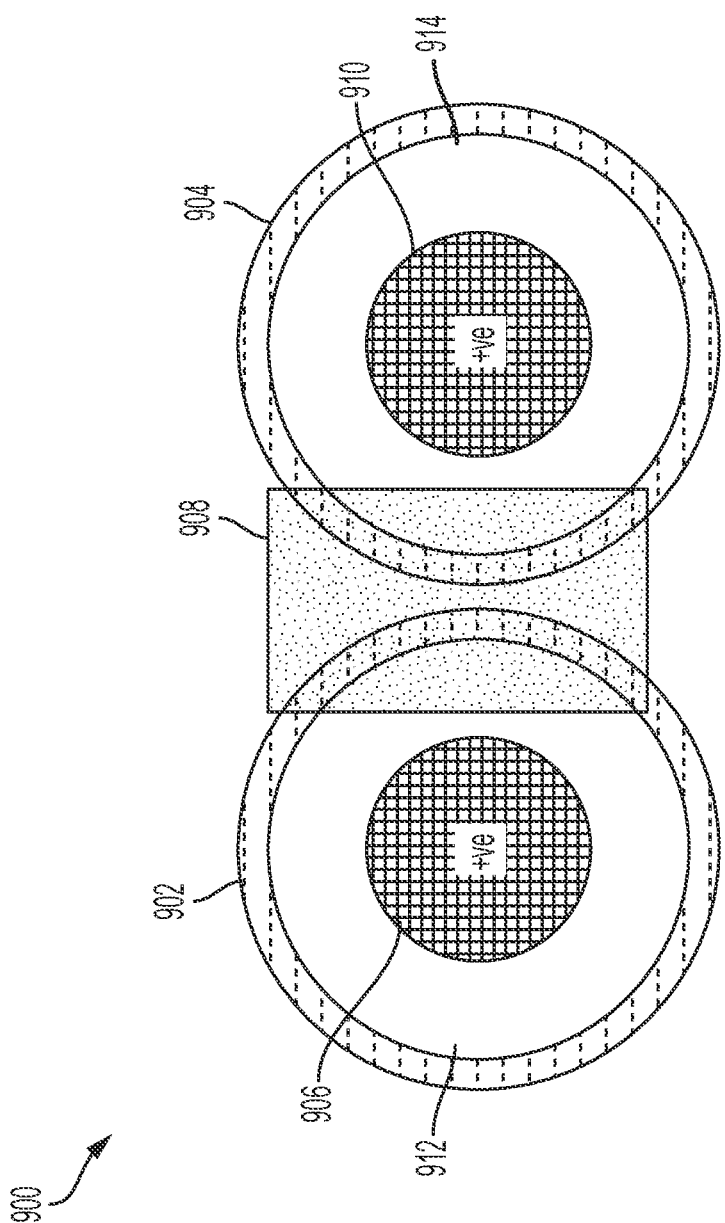
FIG. 9A depicts an overhead view of two battery cells in a peanut configuration with current collectors overlaying the two battery cells, in accordance with present implementations.

FIG. 9A depicts an overhead view of two battery cells 902 and 904 in a peanut configuration with current collectors 906, 908, and 910 overlaying the two battery cells 902 and 904, in accordance with present implementations. The two battery cells 902 and 904 can be battery cells of the battery cells 112. The current collectors 906, 908, and 910 can be current collectors of the current collector assembly 114. The battery cells 902 and 904 can include positive terminals 912 and 914 and a shoulder 920. The shoulders 918 and 920 may be or include negative terminals of the battery cells 918 and 920. The current collectors 906 and 910 can be or include positive current collectors. The current collectors 906 and 910 can overlay (e.g., contact or rest on) the positive terminals 912 and 914 (as indicated by the "+ve" text in FIGS. 9A and 9B) on the battery cells 902 and 904 when the current collectors 906 and 910 are clamped against the battery cells 902 and 904. The current collector 908 can be or include a negative current collector. The current collector 908 can overlay (e.g., contact or rest on) the shoulders 918 and 920 of the battery cells 902 and 904 when the current collector 908 is clamped to or with the battery cells 902 and 904.

Figure 9B:
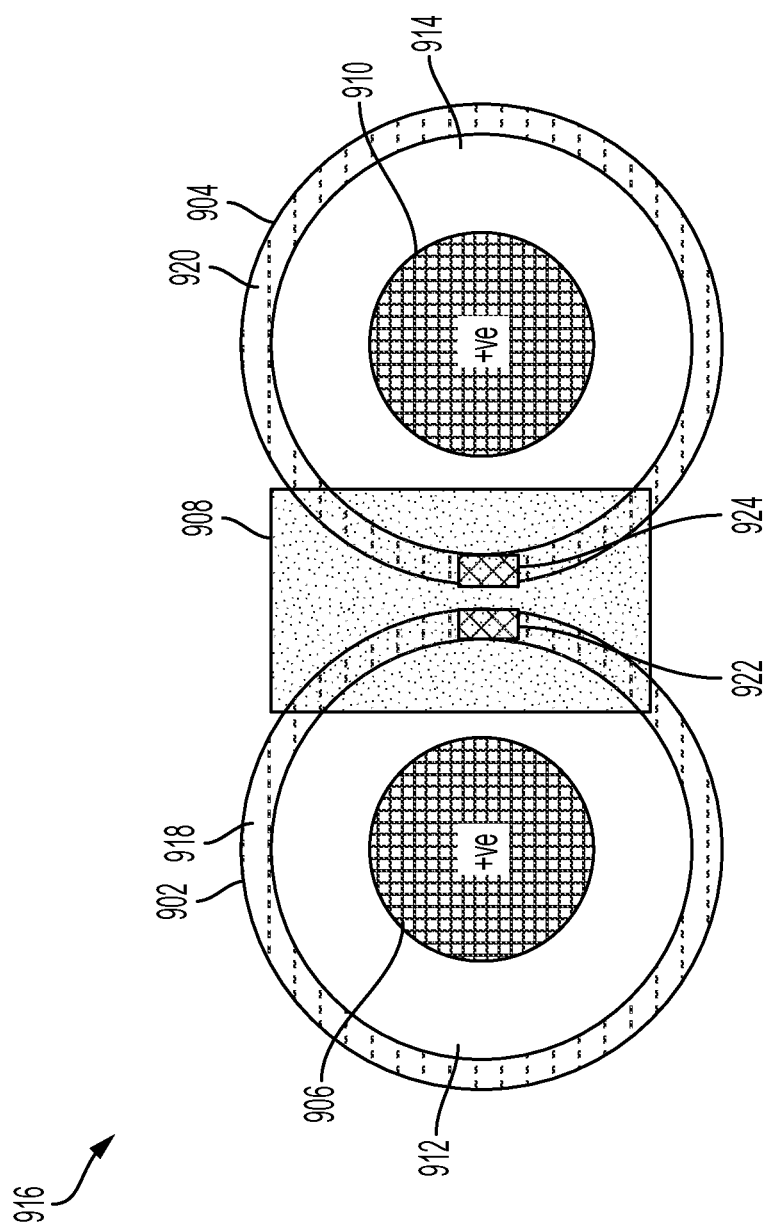
FIG. 9B depicts an overhead view of the two battery cells in a peanut configuration with the current collector welded to the two battery cells, in accordance with present implementations.

FIG. 9B depicts an overhead view 916 of the two battery cells 902 and 904 in a peanut configuration with the current collector 908 welded to the two battery cells 902 and 904, in accordance with present implementations. The current collector 908 can be welded to the battery cells 902 and 904 on the shoulders 918 and 920 (e.g., the edges or corners of the battery cells 902 and 904) at welds 922 and 924. The shoulders 918 and 920 may be or include negative terminals that contact the current collector 908. For example, the current collector 908 can be directly welded to the shoulders 918 and 920 of the battery cells 902 and 904 at the welds 922 and 924, connecting the battery cells 902 and 904 in parallel. Accordingly, the current collector 908 can be welded to the battery cells 902 and 904 such that the current collector 908 remains in contact with the negative terminals of the battery cells 902 and 904.

Figure 10:
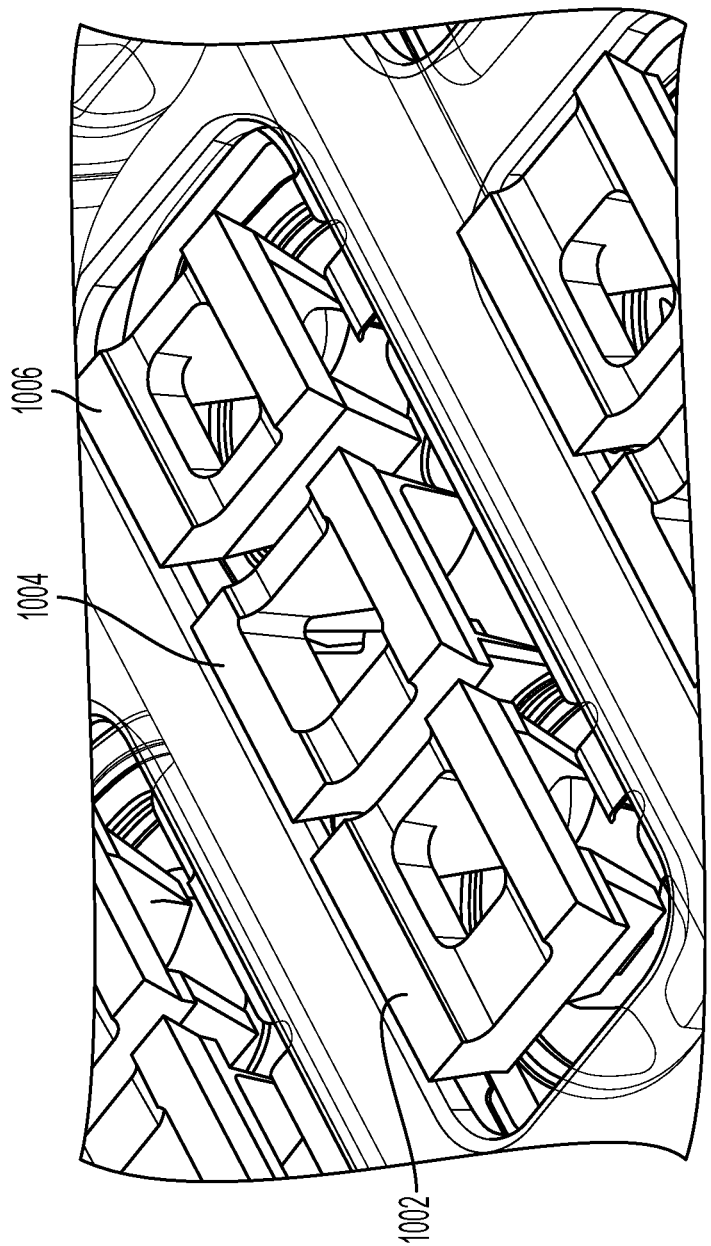
FIG. 10 depicts a perspective view of clamps clamping battery cells to current collectors, in accordance with present implementations.

FIG. 10 depicts a perspective view 1000 of clamps 1002, 1004, and 1006 clamping battery cells to current collectors, in accordance with present implementations. The clamps 1002, 1004, and 1006 can be coupled with a plate (e.g., a plate similar to or the same as the plate 106, shown and described with reference to FIG. 1, among others). The clamp 1002 can be a clamp configured to clamp a positive terminal of a first battery cell to a positive current collector. The clamp 1004 can be a clamp configured to clamp a negative current collector to a negative terminal of the first battery cell and a second battery cell. The clamp 1006 can be a clamp configured to clamp a positive current collector to or with a positive terminal of the second battery cell.

Figure 11:
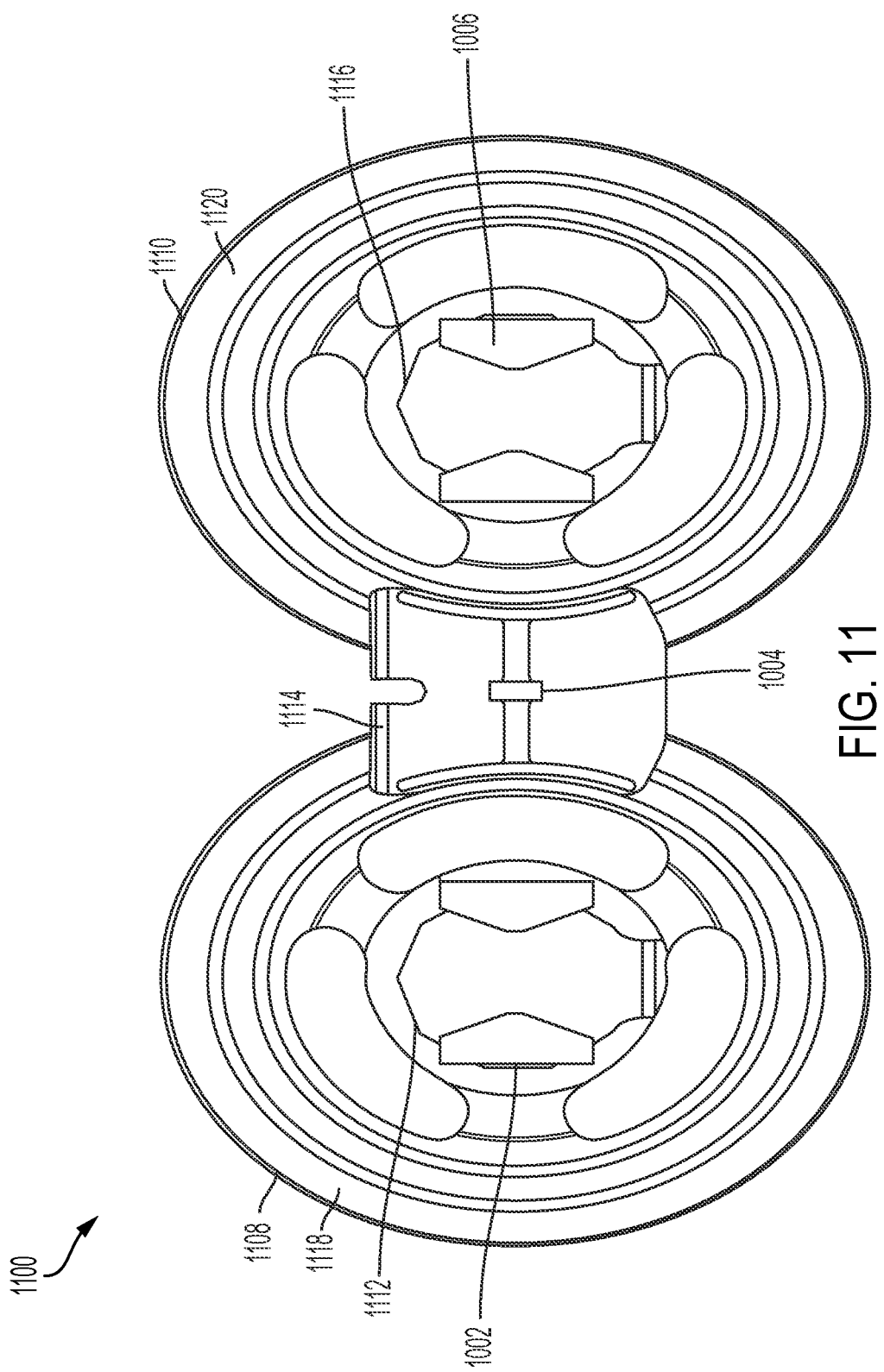
FIG. 11 depicts an overhead view of clamps clamping battery cells to current collectors, in accordance with present implementations.
Figure 12:
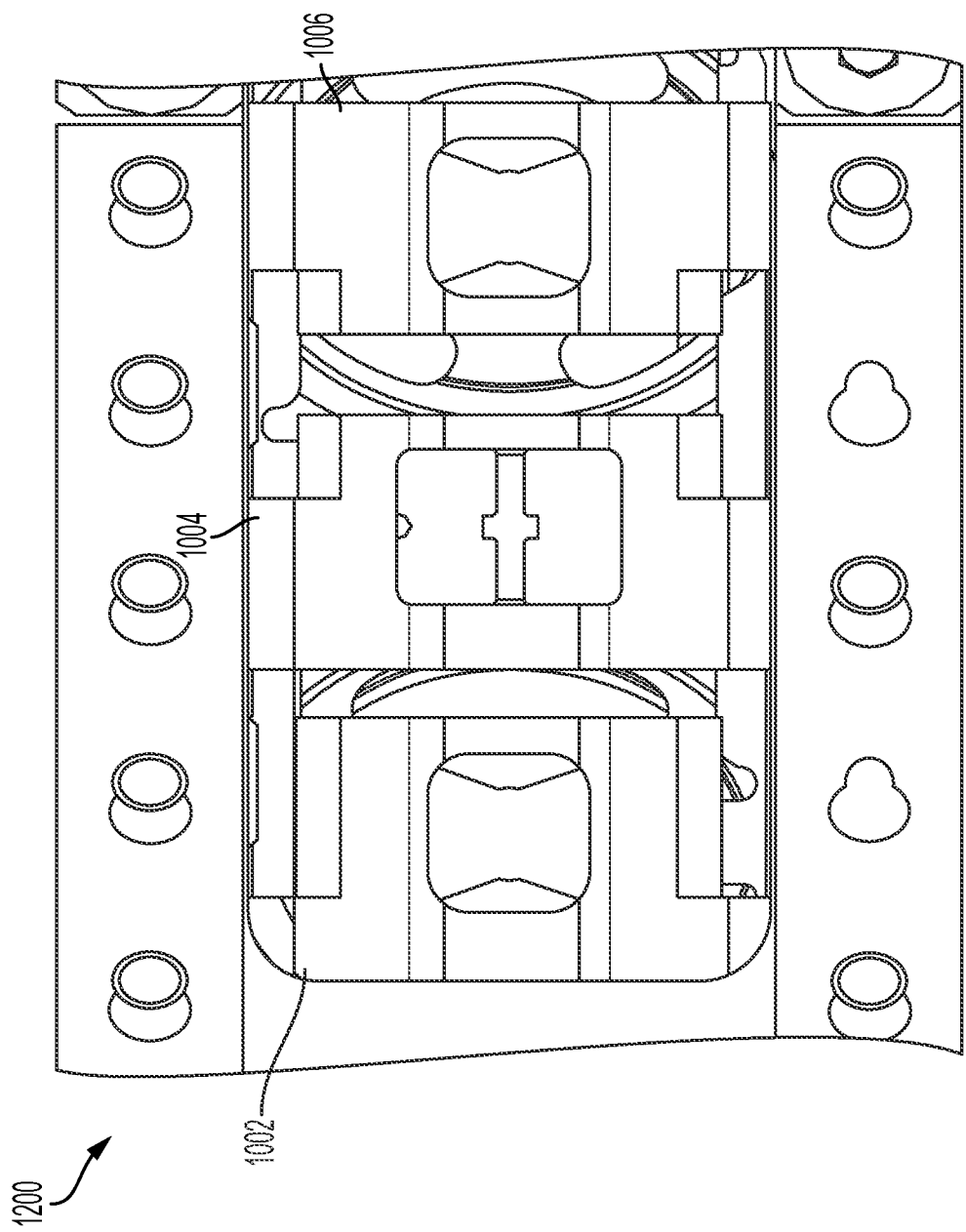
FIG. 12 depicts an overhead view of clamps clamping battery cells to current collectors, in accordance with present implementations.

FIG. 11 depicts an overhead view 1100 of the clamps 1002, 1004, and 1006 clamping battery cells 1108 and 1110 to or with current collectors 1112, 1114, and 1116, in accordance with present implementations. The current collector 1112 can be or include a positive current collector. The current collector 1114 can be or include a negative current collector. The current collector 1116 can be or include a positive current collector. The clamp 1002 can clamp the current collector 1112 to or with a positive terminal of the battery cell 1108. The clamp 1004 can clamp the current collector 1114 to or with negative terminals 1118 and 1120 of the battery cells 1108 and 1110. The clamp 1006 can clamp the current collector 1116 to or with a positive terminal of the battery cell 1110. FIG. 12 depicts an overhead view 1200 of the clamps 1002, 1004, and 1006 clamping battery cells to current collectors, in accordance with present implementations.

Figure 13:
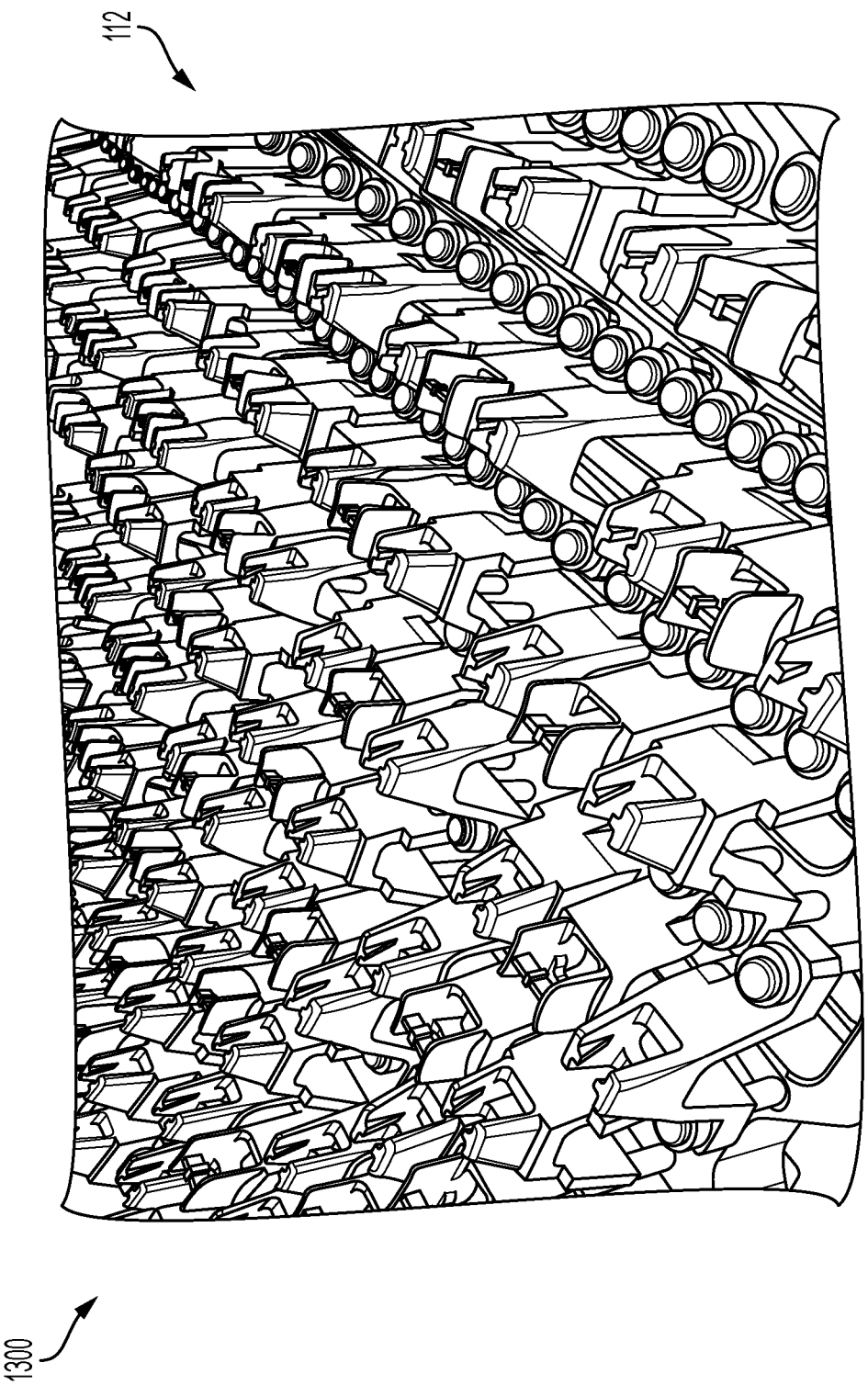
FIG. 13 depicts a perspective view of clamps coupled with one or more plates, in accordance with present implementations.

FIG. 13 depicts a perspective view 1300 of the clamps 110 coupled with one or more plates (e.g., the plate 106), in accordance with present implementations. As illustrated in the perspective view 1300, the clamps 110 can be coupled with one or more plates. The clamps 110 can be coupled with the plate in triplets. The clamps 110 can be coupled with the plate by pins that pass through holders of the clamps, the one or more plates, and fastening assemblies.

Figure 14:
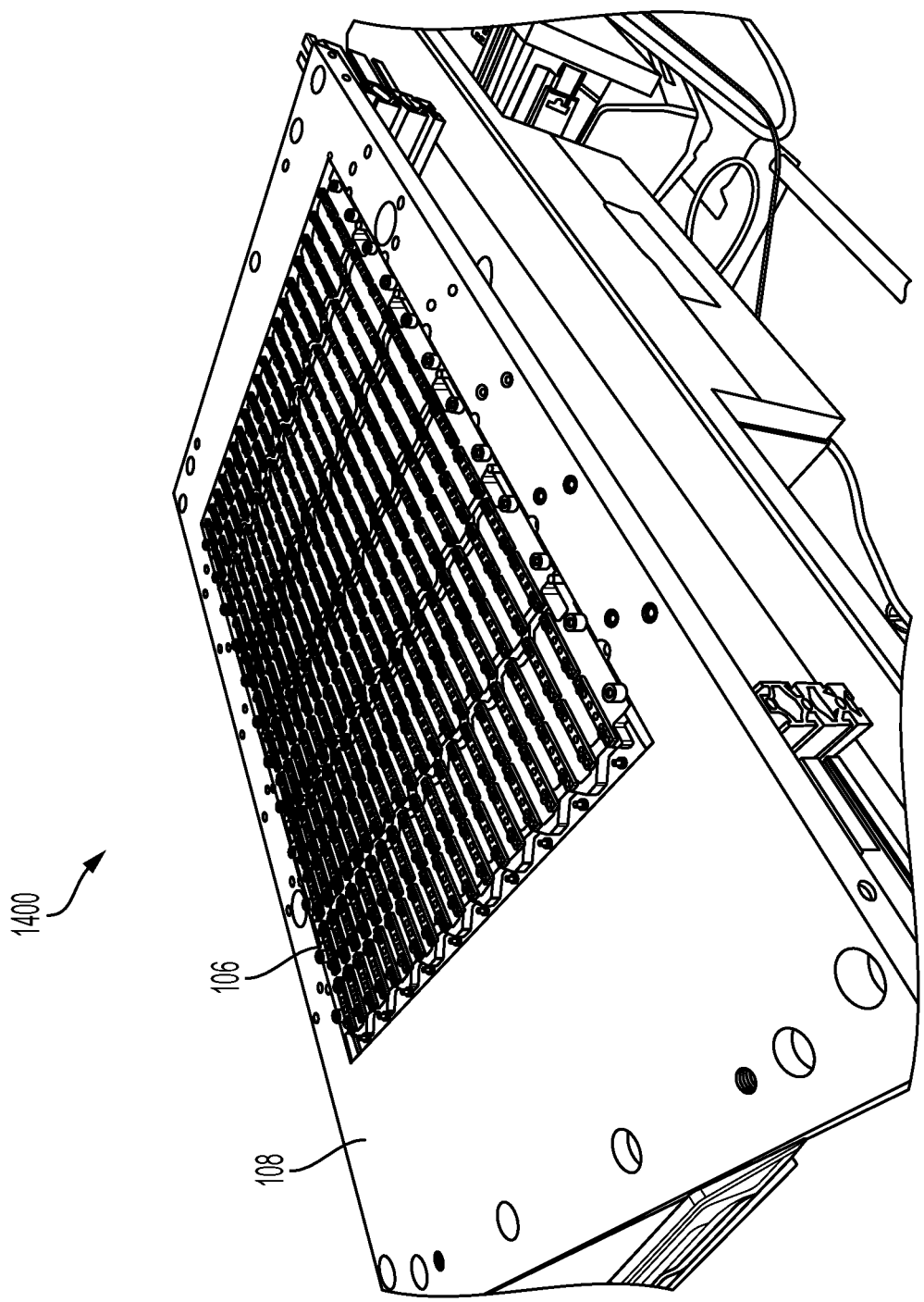
FIG. 14 depicts a perspective view of plates coupled with a board, in accordance with present implementations.

FIG. 14 depicts a perspective view of the plates 106 coupled with the board 108, in accordance with present implementations. The plates 106 can be coupled with the board adjacent to each other within an opening of the board 108. While six plates are shown as coupled with the board 108, any number of plates can be coupled with the board 108.

Figure 15A:
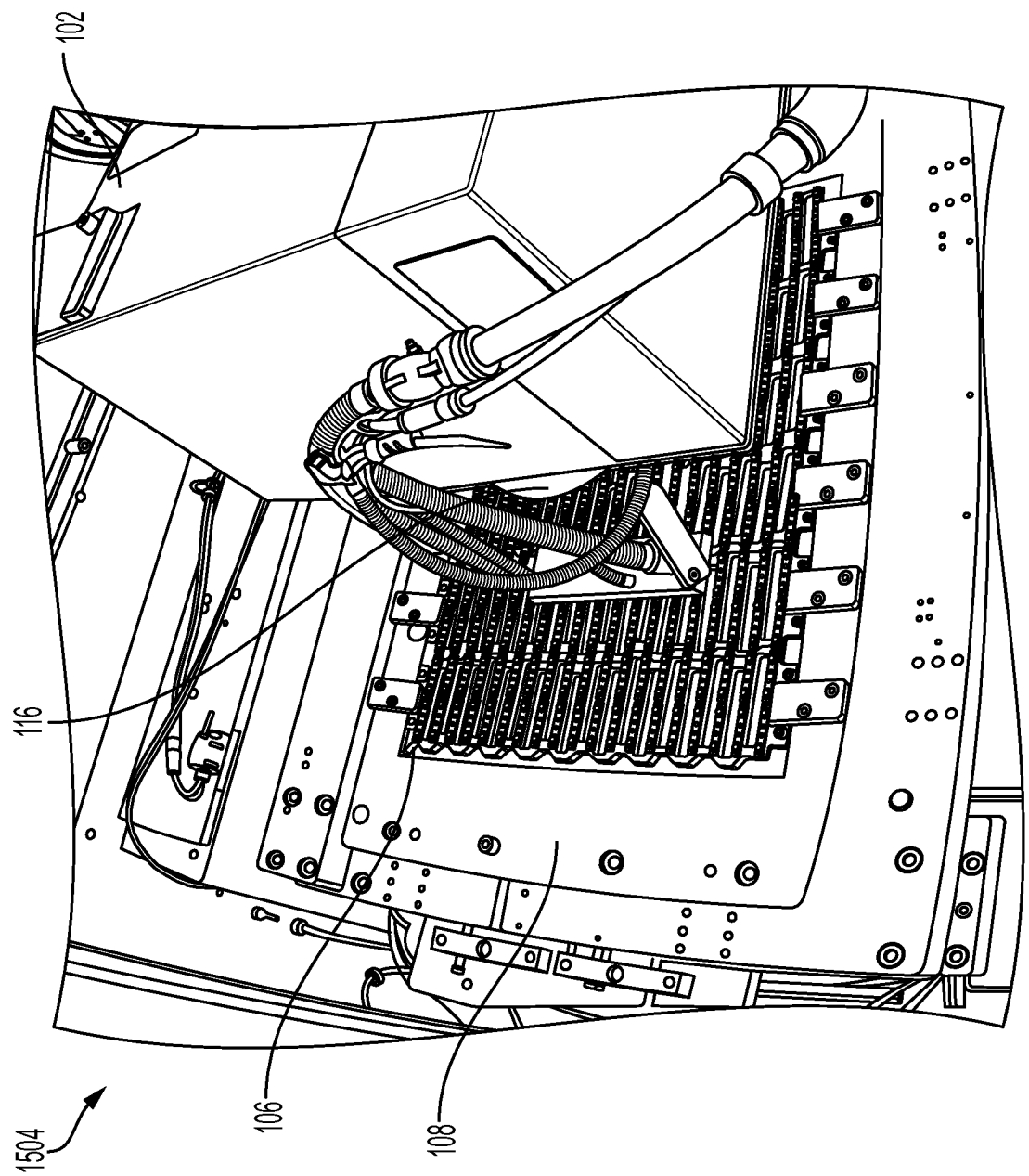
FIGS. 15A and 15B depict illustrations of a welding device welding current collectors to battery cells, in accordance with present implementations.
Figure 15B:
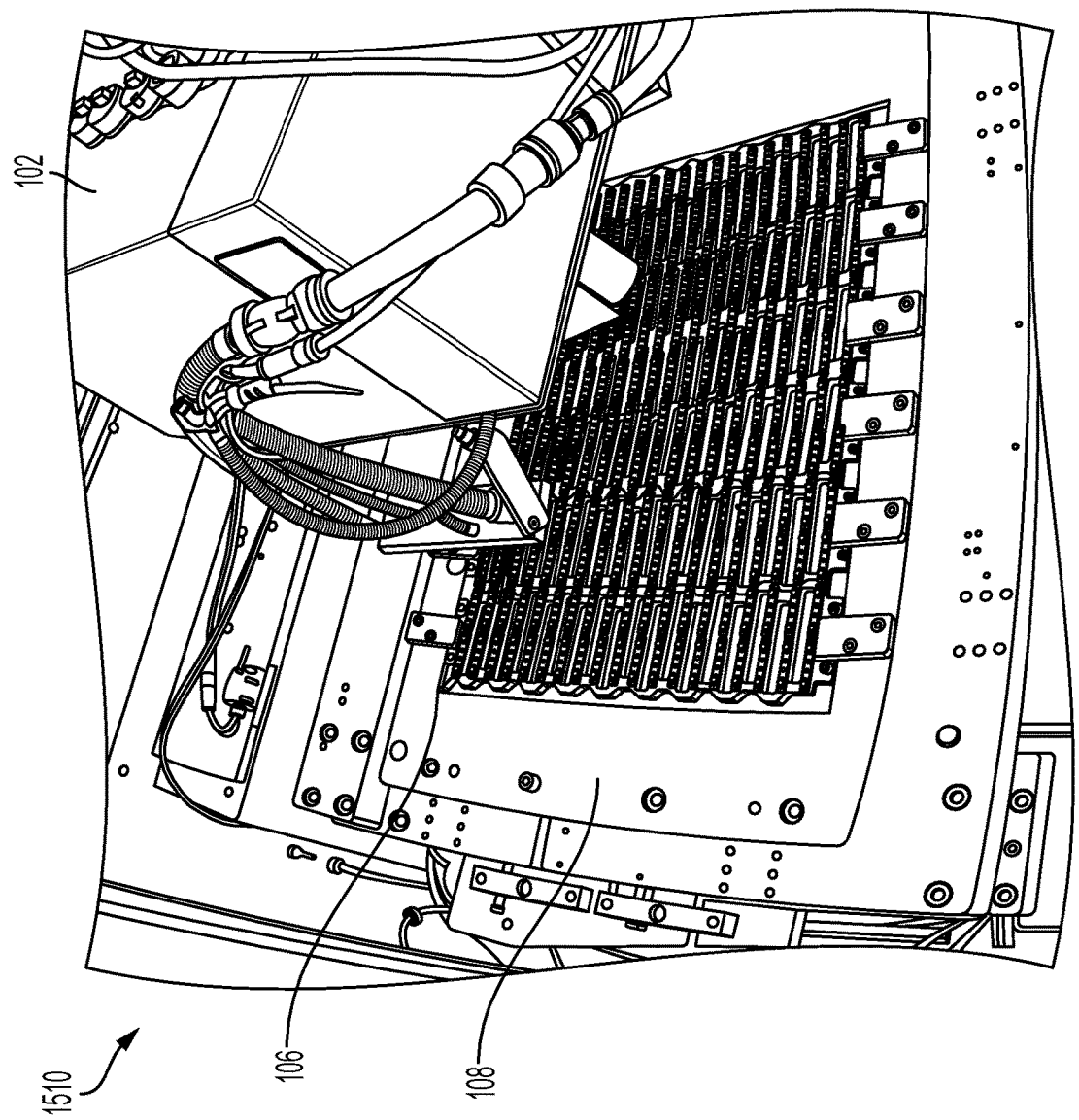

FIG. 15A-15B depict illustrations of the welding device 102 welding current collectors to battery cells, in accordance with present implementations. The welding device 102 can be in a first position 1504 above the plates 106 coupled with the board 108. The welding device 102 can be or include a gantry that is capable of moving in the x, y, or z-axis above the board 108. The welding device 102 can be a laser welding device including the laser 116 configured to weld current collectors to terminals of battery cells using laser or other heating technology. The welding device 102 can move in the z-axis to control the focus of the laser 116 and move to a defined height above the board 108 and plates 106 to laser weld (e.g., micro-weld) the current collectors to terminals of battery cells. The defined height can be the focal length of the laser 116 (e.g., 255 millimeters above the board 108) of the welding device 102. While in the first position 1504, the welding device 102 can direct a laser or heat through the openings of the boards to weld the current collectors to battery cell terminals. The welding device 102 can weld a defined number (e.g., 18) of current collectors while in the first position 1504, and then move in the x or y direction over the board 108 and the plates 106 to a second position 1510 to perform the same or a different number of welds of current collectors to battery cells. The welding device 102 can move between positions over the board 108 and plates 106 to weld current collectors to terminals without moving in the z direction to clamp the current collectors and terminals together, thus increasing the speed of the welding process. In one example, the welding device 102 can perform 18 welds per position above the board 108 and plates 106.

Figure 16:
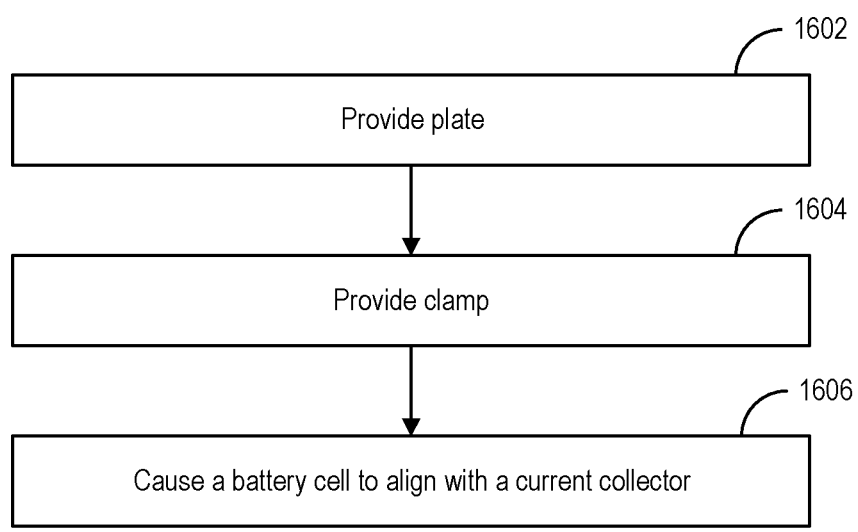
FIG. 16 depicts a method of clamping current collectors to battery cells using a mask, in accordance with present implementations.

FIG. 16 depicts a method of clamping current collectors to battery cells using a mask, in accordance with present implementations. The method 1600 can include providing a plate (ACT 1602). The method 1600 can include providing a clamp (ACT 1604). The method 1600 can include causing a battery cell to align with a current collector (ACT 1606). The acts of the method 1600 can be interchangeable or removed. Additional acts can be added to the method 1600.

The method 1600 can include providing a plate (ACT 1602). The plate can include one or more openings. When the mask includes multiple openings, the openings can be separated from each other in a row or other pattern. For example, the plate can have a substantially rectangular shape. The openings can be evenly spaced in one or more rows of the rectangular shaped-plate. The openings can each have substantially the same shape or size.

Clamps can be coupled to or with the plate. A clamp of the clamps can be in a "V-shape" and include two legs. The two legs can extend away from each other. The two legs can be coupled with each other through a flat platform. The flat platform can have an opening in the middle. The opening can enable the clamp to clamp a current collector to a battery cell (e.g., a terminal of a battery cell) such that the current collector is observable or at least partially exposed through the opening in the clamp.

The clamps can be coupled to or with the plate by pins. For example, pins can pass through the plate and through portions (e.g., the legs) of the clamps. Opposite ends of the pins can include flanges extending outwards from the pin. The flanges of one end of a pin can rest or press against a top surface of the board. The flanges of another end of the pin can rest or press against a holder attached to a clamp the pin is coupling to the plate. The pins can pass through springs. The pins can pass through the springs into the clamps. The pins can do so such that the springs are between the plate and the clamps.

The clamps can be coupled to or with the plate such that the two legs of each clamp are on opposing sides of an opening in the board. Both legs can be coupled to or with the board via individual pins. A spring can be between each leg and the board. Thus, when coupled to or with the board, the two springs between the legs and the board can decompress and can because the ends of the clamps towards each other. The plate, springs, and clamps, together, can be or include a mask.

The method 1600 can include providing a clamp (ACT 1604). The clamp can be coupled with or to the board. The clamp can be coupled with or to the board with other clamps. The clamps can couple one or more battery cells with or to the plate. The clamps can couple individual battery cells with the board. The clamps can couple current collectors with the battery cells. In one example, multiple battery cells can be placed under the plate. The battery cells can be forced or lifted upwards towards the plate. The force or lift can cause the battery cells to be placed into the clamps coupled with the board. When clamped, terminals of the battery cells can be exposed or observable through openings in the plate.

In another example, a current collector assembly can overlay or be placed on top of a set of battery cells (e.g., a plurality of battery cells). The current collector assembly can include current collectors spaced apart from each other in a substantially flat configuration. The current collector assembly can be configured such that the current collectors of the assembly are above terminals of battery cells to which the current collectors are to be welded. The battery cells can be forced or lifted into the clamps with the current collectors on top of the battery cells. The clamps can receive the battery cells and current collectors and clamp the current collectors to or with the battery cells to hold the current collectors and battery cells in place. As clamped, the current collectors or terminals can be exposed or observable through openings in the plate. Clamping the current collectors and the battery cells can align (e.g., overlay) the current collectors with the terminals. Thus, a welding device welding from above the plate can weld the current collectors to the terminals through the openings.

The battery cells can be coupled to or with the plate in pairs. Three clamps (e.g., a triplet of clamps) can couple such a pair of battery cells to the plate. For example, one clamp of a triplet of clamps can be configured to couple a positive terminal of a battery cell of a pair of battery cells to a positive current collector. Another clamp of the triplet of clamps can be configured to couple a positive terminal of the other battery cell of the pair of battery cells to another positive current collector. The third clamp of the three clamps can be configured to couple negative terminals of both battery cells to a negative current collector (e.g., a common current collector or a single current collector). Multiple pairs of cells can be clamped to or with the plate in this manner. Accordingly, pairs of battery cells can be clamped to or with the plate such that the pairs of battery cells can be welded together via a common or single negative current collector.

The method 1600 can include causing a battery cell to align with a current collector (ACT 1606). The springs between the clamp and the plate can bias the clamp. When lifting the battery cells or current collector assembly into the clamps, the springs between the clamps and the plate can compress. Once the force stops being exerted onto the battery cells or current collector assembly, the springs can decompress, thus forcing the ends of the clamp towards each other and away from the plate, clamping the battery cells and current collectors together and aligning the current collectors with terminals on the battery cells.

Figure 17:
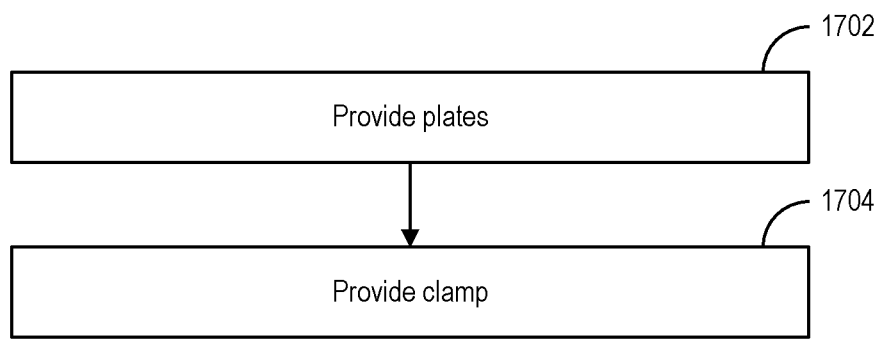
FIG. 17 depicts a method of clamping current collectors with battery cells using multiple masks, in accordance with present implementations.

FIG. 17 depicts a method 1700 of clamping current collectors with battery cells using multiple masks, in accordance with present implementations. The method 1700 can include providing plates (ACT 1702). The method 1700 can include providing clamps (ACT 1704). The acts of the method 1700 can be interchangeable or removed. Additional acts can be added to the method 1700.

The method 1700 can include providing plates (ACT 1702). The plates can be similar to the plates described with respect to ACT 1602. For example, each of the plates can include one or more openings. The plates can be coupled with a board. The plates can be coupled with the board adjacent to each other (e.g., coupled to or with the board in parallel with each other).

The method 1700 can include providing clamps (ACT 1704). Battery cells (e.g., battery cells of a battery module) can be coupled to or with the plates. The battery cells can be coupled with the plates by clamps that are coupled to or with the plates that are configured to clamp the battery cells with or to current collectors that overlay the battery cells. For example, the battery cells can be coupled to or with the plates in pairs by triplets of clamps. One clamp of a triplet can clamp a positive current collector to a positive terminal of a battery cell of a pair of battery cells, another clamp of the triplet can clamp a positive current collector to a positive terminal of the other cell of the pair, and the third clamp of the triplet can clamp a negative current collector to negative terminals on both battery cells. The battery cells can be clamped to or with the plates prior to welding the current collectors to the terminals to maintain the positions of the current collectors in relation to the battery cells. Clamping the battery cells to or with the current collectors and then welding the current collectors to the battery cells can avoid the need to break up the welding process into the steps of clamping and then welding for each individual weld.

Figure 18:
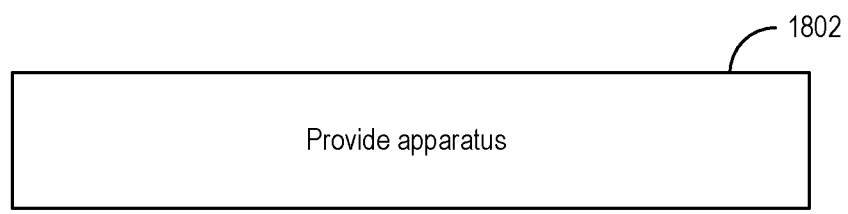
FIG. 18 depicts a method of providing a mask for clamping battery cells to current collectors, in accordance with present implementations.

FIG. 18 depicts a method 1800 of providing a mask for clamping battery cells to current collectors, in accordance with present implementations. The method 1800 can include providing an apparatus (ACT 1802). The acts of the method 1800 can be interchangeable or removed. Additional acts can be added to the method 1800.

The method 1800 can include providing an apparatus (ACT 1802). The apparatus can include a plate. The plate can be coupled to or with (e.g., affixed to) a board. For example, the board can include an opening in the middle. The plate can be placed within the opening and coupled to or with the board. Clamps can be coupled to or with the plate. The clamps can be coupled to or with the plate by pins that extrude through the plate and the clamps. The individual clamps can be configured to clamp positive or negative current collectors in place over or on battery cells. The clamps can clamp the current collectors in place over or on the battery cells such that the current collectors are exposed or observable through one or more openings in the plate. Springs can be coupled to or with the plate and the clamps. The springs can be coupled to or with the plate and the clamps between the clamps and the plate. The springs can be coupled to or with the plate and the clamps to bias the clamps towards the current collectors or battery cells, thus coupling the current collectors to the battery cells.

Figure 19:
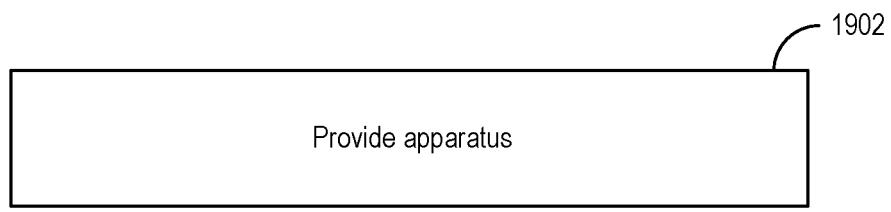
FIG. 19 depicts a method of providing multiple masks for clamping battery cells to current collectors, in accordance with present implementations.

FIG. 19 depicts a method 1900 of providing multiple masks for clamping battery cells to current collectors, in accordance with present implementations. The method 1900 can include providing an apparatus (ACT 1902). The acts of the method 1900 can be interchangeable or removed. Additional acts can be added to the method 1900.

The method 1900 can include providing an apparatus (ACT 1902). The apparatus can include multiple plates. The multiple plates can each include one or more openings. The multiple plates can be coupled to or with a board. For example, the board can include an opening in the middle. The plates can be placed within the opening and coupled to or with (e.g., affixed to) the board. The plates can be coupled to or with the board at opposing sides of the opening. The plates can be coupled with the board adjacent to each other such that the top sides of the plates are flesh with each other.

Clamps can be coupled to or with the plates. The clamps can be coupled to or with the plates by pins that extrude through the plates and the clamps. The individual clamps can be configured to clamp positive or negative current collectors in place over or on battery cells. The battery cells can be battery. The clamps can clamp the current collectors in place over or on the battery cells such that the current collectors are exposed or observable through one or more openings in the plates. By clamping the current collectors in place (e.g., align) over or on the battery cells with clamps coupled to or with the plates, the clamps can couple the battery cells to the plates.

Figure 20:
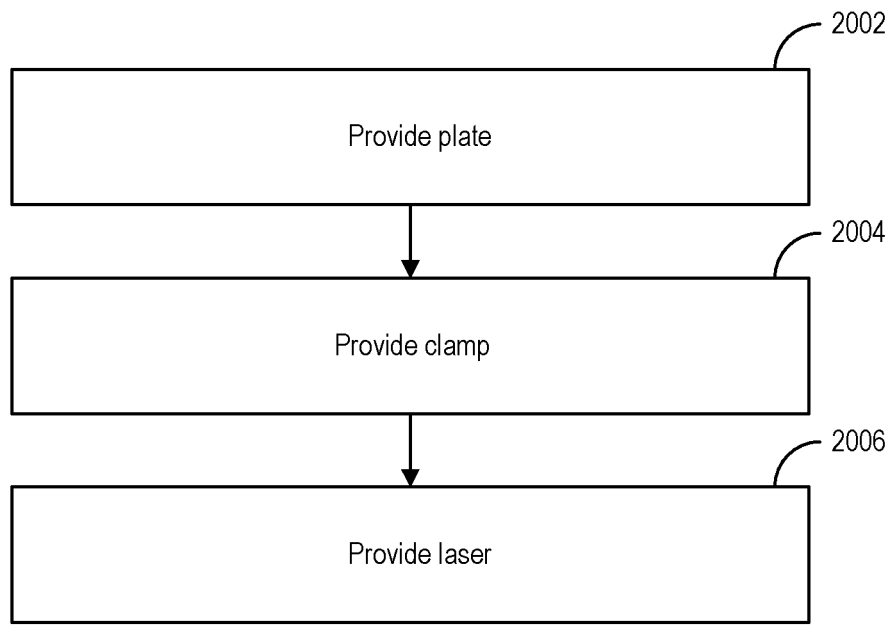
FIG. 20 depicts a method of providing a mask and a laser, in accordance with present implementations.

FIG. 20 depicts a method 2000 of providing a mask and a laser, in accordance with present implementations. The method 2000 can include providing a plate (ACT 2002). The method 2000 can include providing a clamp (ACT 2004). The method 2000 can include providing a laser (ACT 2006). The acts of the method 2000 can be interchangeable or removed. Additional acts can be added to the method 2000.

The method 2000 can include providing a plate (ACT 2002). The plate can be similar to the plate described with respect to ACT 1602. For example, the plate can include one or more openings that are adjacent or next to each other. The one or more openings can be in parallel with each other in rows or dispersed across the plate in a pattern (e.g., a defined pattern).

The method 2000 can include providing a clamp (ACT 2004). The clamp can be coupled with the plate. The clamp can couple a battery cell with the plate. The clamp can clamp a current collector with a terminal for the battery cell. The clamp can clamp the current collector with the terminal for the battery cell such that the current collector or the terminal is at least partially exposed through the opening.

The method 2000 can include providing a laser (ACT 2006). The laser can be configured to micro-weld the current collector with the terminal for the battery cell through the opening. The laser can be configured to move in a pattern over the plate with a welding device to which the laser is attached. In doing so, the laser can move in the x or y direction, stopping at different positions, over the plate. Moving the laser to a portion of a battery cell can mean pointing the laser to the portion of the battery cell. The laser can weld (e.g., micro-weld) multiple current collectors to terminals for battery cells at each position the laser stops.

To move the laser over the plate and begin welding the current collectors to battery cells, a video camera or other image capture device (e.g., a camera) can scan the plate to identify an edge or other defined object of the plate. For example, an image capture device attached or coupled to or with a welding device including or containing a laser can capture images or video of the plate. The image capture device can transmit the images or video to a processor (e.g., a processor of a controller) having a processor and memory. The processor can receive the images or video and use object recognition techniques on the images or video to identify an edge or other defined object (e.g., a corner of the plate or an edge of an opening in the plate). Upon identifying the edge or other defined object, the processor can initiate welding current collectors to terminals of battery cells through the one or more openings in the plate.

To initiate welding current collectors to terminals of battery cells, the processor can retrieve a pattern from memory (e.g., memory of the welding device or memory of the controller). The pattern can be an order of movement of the welding device over the plate or a pattern of an order of movement and an order in which the laser of the welding device welds current collectors to terminals of battery cells clamped with the plate. The processor can retrieve such a pattern and control the welding device or the laser to weld current collectors to terminals of battery cells through the openings in the plate.

The laser can move (e.g., move with the welding device to which the laser is attached) following the pattern retrieved from memory. In doing so, the laser can move from position to position of the pattern. At each position, the laser can point, rotate, or be directed to different portions of battery cells clamped to or with the plate. For example, the laser can move to a first position by the processor after the processor identifies an edge or corner in the plate or an opening of the plate. The processor can move the laser to the first position by transmitting a control signal to the welding device that includes the laser indicating coordinates of the first position to move to or a vector in which to move to reach the first position. The welding device can receive the control signal and move to the first position. Upon reaching the first position, the laser can weld (e.g., micro-weld) a line segment (e.g., a line from point A to point B) on a portion of a battery cell between an opening in the plate. In doing so, the laser can weld a positive or negative current collector to a positive or negative terminal of the battery cell.

The laser can weld a number of line segments of battery cells from the first position according to control signals directing the laser. To do so, the laser can move, rotate, or be directed (e.g., directed by the processor with one or more control signals) to point in different directions or at different locations of the terminals of the battery cells. For instance, at a position of the welding device, the laser can be controlled to weld different locations in the openings of the plate to weld the current collectors to the battery cells clamped with the plate. The laser can complete a welding pattern and the welding device can move to another position according to the pattern the processor retrieved from memory.

The welding device can move to a second position. The welding device can move to the second position according to the pattern the processor retrieved. The welding device can move to the second position according to a control signal the processor transmitted to the welding device. At the second position, the laser can weld line segments other battery cells or the same battery cells exposed through the openings in the plate that the welding device welded at the first position. For instance, the laser can weld a positive current collector to a positive terminal of a battery cell at the first position and a negative current collector to a negative terminal of the battery cell (e.g., the same battery cell) at the second position. The welding device or laser can continue operating in this manner until completing the pattern the processor retrieved from memory.

The laser can change back and forth between an inactive state (e.g., off) to an inactive state (e.g., on) when welding current collectors to terminals of the battery cells clamped to or with the plate. For example, the laser can remain in an inactive state prior to welding a current collector onto a terminal of a battery cell. The processor can transmit a control signal to the laser or the welding device to cause the laser to turn on or change into the active state and weld (e.g., micro-weld) a line segment on a portion (e.g., a first portion) of the battery cell. The processor can then transmit a control signal to turn the laser off or change the state of the laser to the inactive estate. The processor can transmit a control signal to the welding device to move the laser to another position or to point in another direction towards a second portion of the battery cell. The processor can transmit a control signal to turn the laser on or change the state of the laser to the active state and weld a line segment on another portion (e.g., a second portion) of the battery cell or another battery cell.

Configuring a welding mask in the manner described herein can provide several advantages. For example, in operation (e.g., when welding current collectors to battery cells clamped to or with the mask) the weld mask can minimize the number of discrete product touch operations and movements performed by the welding device (e.g., the automated laser welding station) performing the welding. Also, because the welding device may not need to clamp the current collectors and battery cells together itself, the configuration can reduce the payload of the gantry of the welding device, allowing the gantry to move at much higher speeds. Additionally, the weld mask can provide the clamping force necessary for the laser weld process to an entire battery module or set of battery cells (e.g., 432 battery cells) at once. The weld mask can additionally provide flexibility during initial set up, allowing the mask to match the tolerance stack up of any given battery module shape or configuration.

Figure 21:
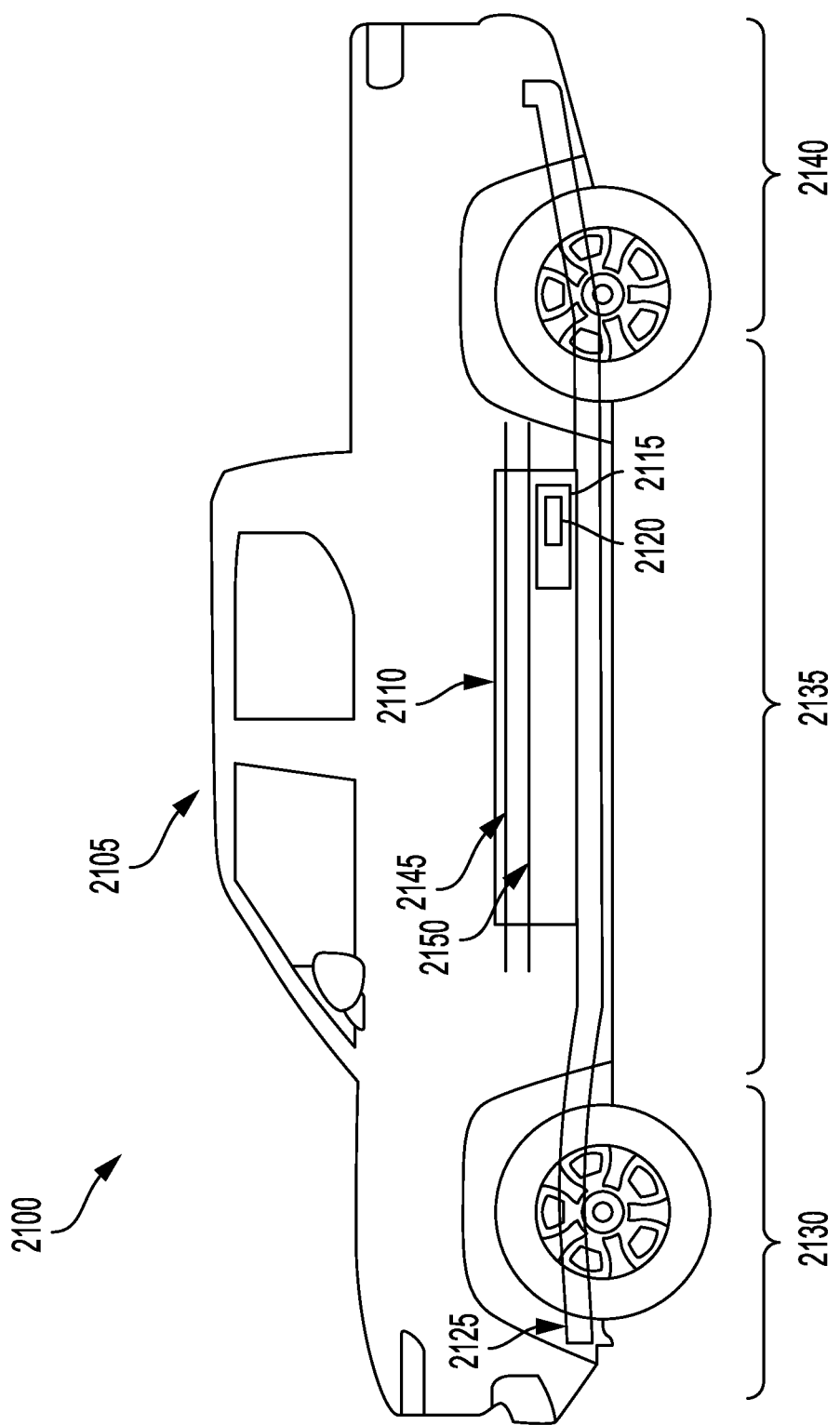
FIG. 21 depicts an electric vehicle, in accordance with present implementations.

FIG. 21 depicts an example cross-sectional view 2100 of an electric vehicle 2105 installed with at least one battery pack 2110. Electric vehicles 2105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 2110 can also be used as an energy storage system to power a building, such as a residential home or commercial building. Electric vehicles 2105 can be fully electric or partially electric (e.g., plug-in hybrid) and further, electric vehicles 2105 can be fully autonomous, partially autonomous, or unmanned. Electric vehicles 2105 can also be human operated or non-autonomous. Electric vehicles 2105 such as electric trucks or automobiles can include on-board battery packs 2110, batteries 2115 or battery modules 2115, or battery cells 2120 to power the electric vehicles. The electric vehicle 2105 can include a chassis 2125 (e.g., a frame, internal frame, or support structure). The chassis 2125 can support various components of the electric vehicle 2105. The chassis 2125 can span a front portion 2130 (e.g., a hood or bonnet portion), a body portion 2135, and a rear portion 2140 (e.g., a trunk, payload, or boot portion) of the electric vehicle 2105. The battery pack 2110 can be installed or placed within the electric vehicle 2105. For example, the battery pack 2110 can be installed on the chassis 2125 of the electric vehicle 2105 within one or more of the front portion 2130, the body portion 2135, or the rear portion 2140. The battery pack 2110 can include or connect with at least one busbar, e.g., a current collector element. For example, the first busbar 2145 and the second busbar 2150 can include electrically conductive material to connect or otherwise electrically couple the battery modules 2115 or the battery cells 2120 with other electrical components of the electric vehicle 2105 to provide electrical power to various systems or components of the electric vehicle 2105.

Figure 22A:
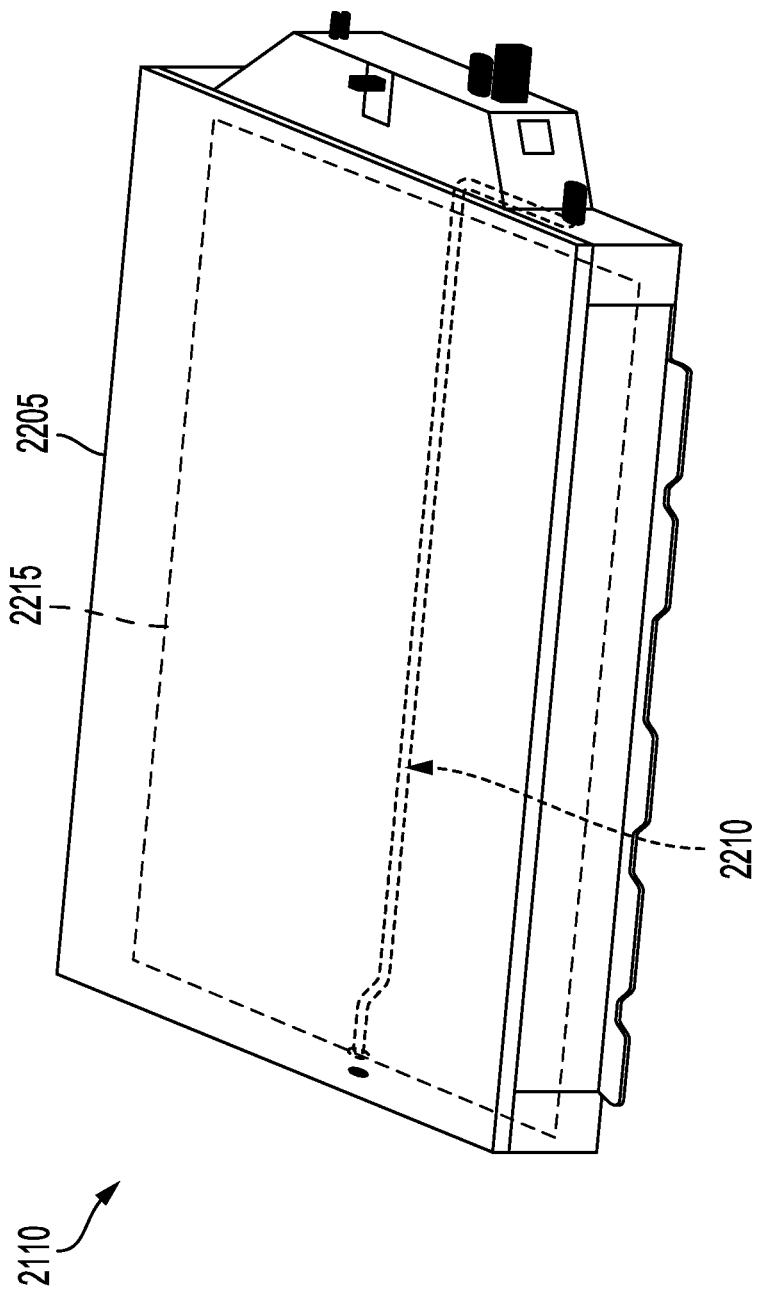
FIG. 22A depicts a battery pack, in accordance with present implementations.

FIG. 22A depicts an example battery pack 2110. Referring to FIG. 22A, among others, the battery pack 2110 can provide power to electric vehicle 2105. Battery packs 2110 can include any arrangement or network of electrical, electronic, mechanical or electromechanical devices to power a vehicle of any type, such as the electric vehicle 2105. The battery pack 2110 can include at least one housing 2205. The housing 2205 can include at least one battery module 2115 or at least one battery cell 2120, as well as other battery pack components. The battery module 2115 can be or can include one or more groups of prismatic cells, cylindrical cells, pouch cells, or other form factors of battery cells 2120. The housing 2205 can include a shield on the bottom or underneath the battery module 2115 to protect the battery module 2115 and/or cells 2120 from external conditions, for example if the electric vehicle 2105 is driven over rough terrains (e.g., off-road, trenches, rocks, etc.) The battery pack 2110 can include at least one cooling line 2210 that can distribute fluid through the battery pack 2110 as part of a thermal/temperature control or heat exchange system that can also include at least one thermal component (e.g., cold plate) 2215. The thermal component 2215 can be positioned in relation to a top submodule and a bottom submodule, such as in between the top and bottom submodules, among other possibilities. The battery pack 2110 can include any number of thermal components 2215. For example, there can be one or more thermal components 2215 per battery pack 2110, or per battery module 2115. At least one cooling line 2210 can be coupled with, part of, or independent from the thermal component 2215.

Figure 22B:
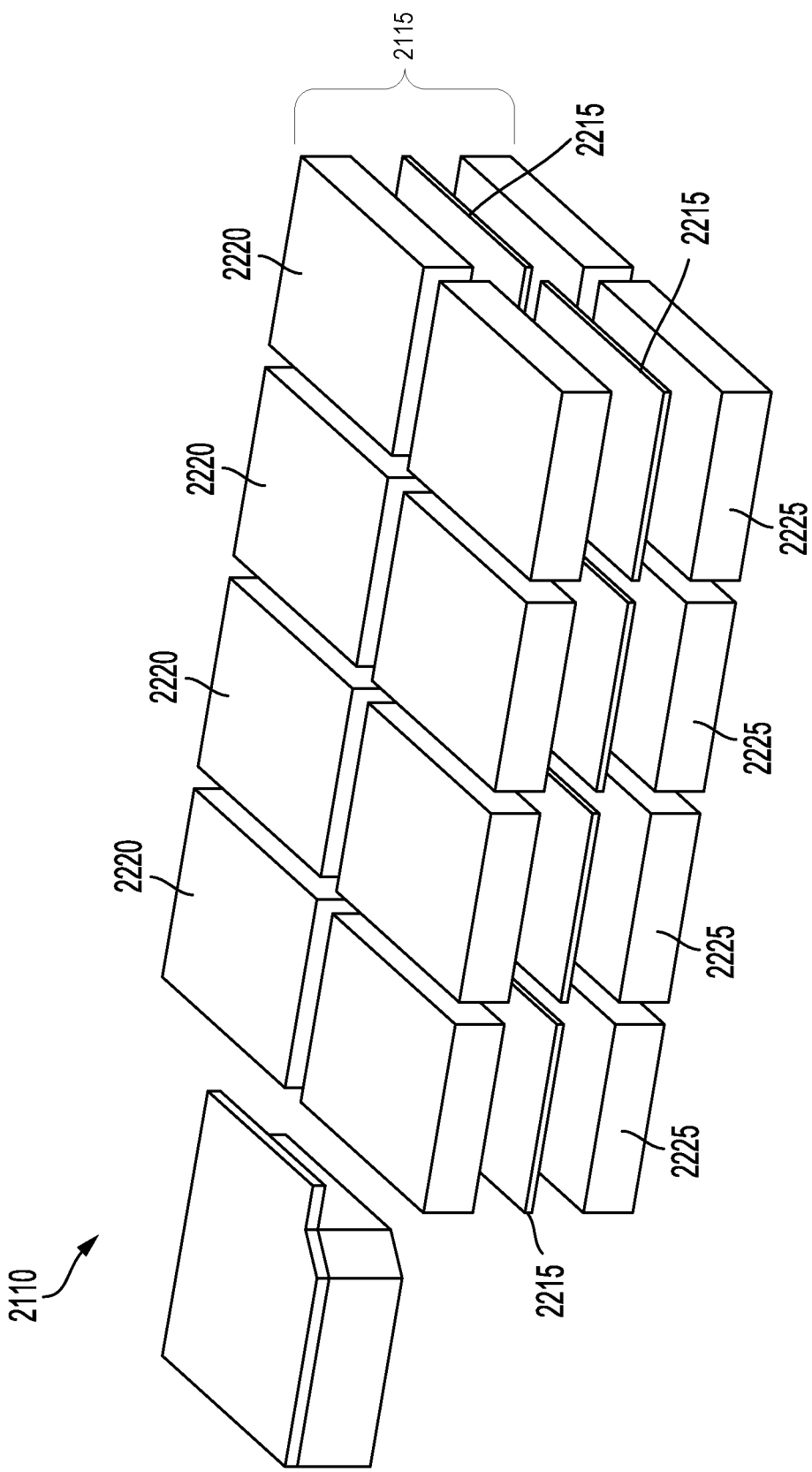
FIG. 22B depicts a battery module, in accordance with present implementations.
Figure 22C:
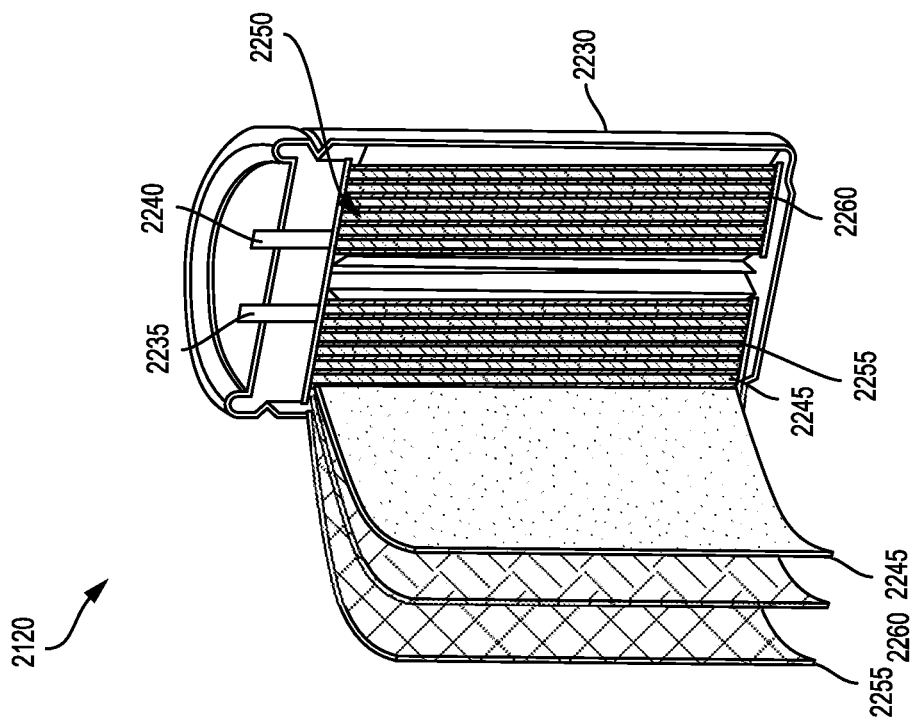
FIG. 22C depicts a cross-sectional view of a battery cell, in accordance with present implementations.
Figure 22D:
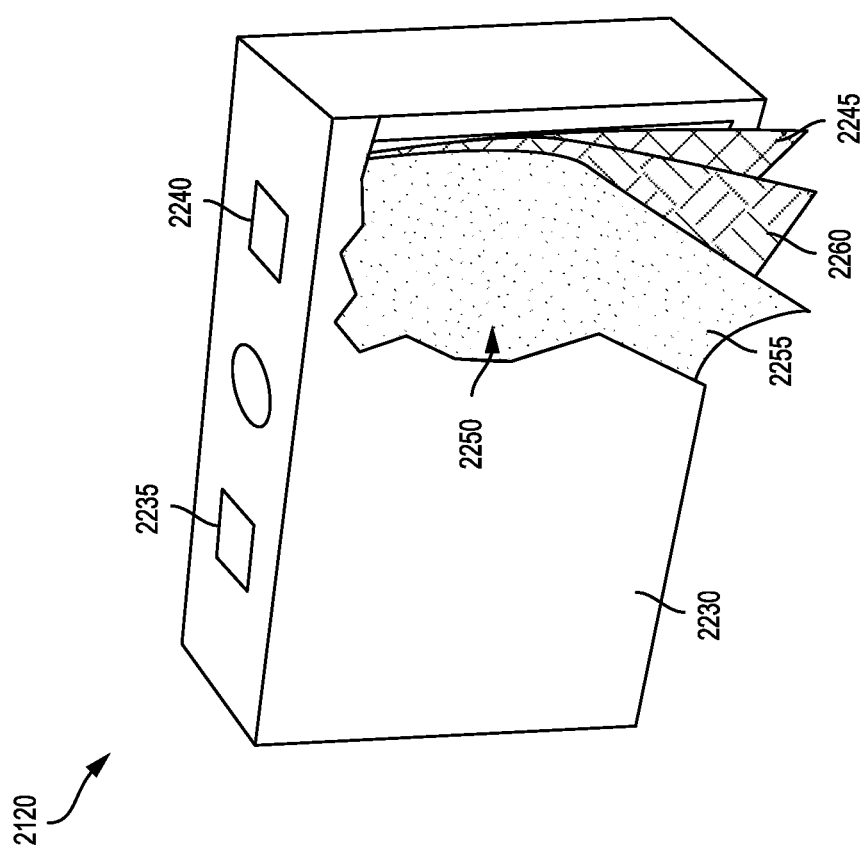
FIG. 22D depicts a cross-sectional view of a battery cell, in accordance with present implementations.
Figure 22E:
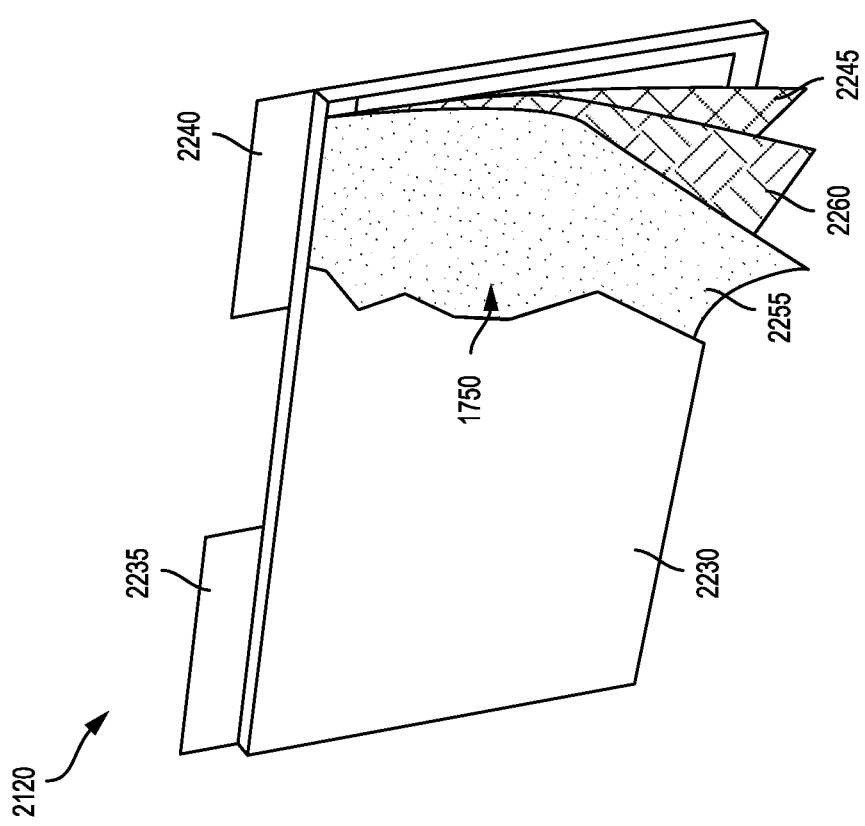
FIG. 22E depicts a cross-sectional view of a battery cell, in accordance with present implementations.

FIG. 22B depicts example battery modules 2115, and FIGS. 22C, 22D and 22E depict an example cross sectional view of a battery cell 2120. The battery modules 2115 can include at least one submodule. For example, the battery modules 2115 can include at least one first (e.g., top) submodule 2220 or at least one second (e.g., bottom) submodule 2225. At least one thermal component 2215 can be disposed between the top submodule 2220 and the bottom submodule 2225. For example, one thermal component 2215 can be configured for heat exchange with one battery module 2115. The thermal component 2215 can be disposed or thermally coupled between the top submodule 2220 and the bottom submodule 2225. One thermal component 2215 can also be thermally coupled with more than one battery module 22115 (or more than two submodules 2220, 2225).

The thermal components 2215 shown adjacent to each other can be combined into a single thermal component 2215 that spans the size of one or more submodules 2225 or 2230. The thermal component 2215 can be positioned underneath submodule 2225 and over submodule 2230, in between submodules 2225 and 2230, on one or more sides of submodules 2225/2230, among other possibilities. The thermal component 2215 can be disposed in sidewalls, cross members, structural beams, among various other components of the battery pack, such as battery pack 2110 described above. The battery submodules 2220, 2225 can collectively form one battery module 2115. In some examples each submodule 2220, 2225 can be considered as a complete battery module 2115, rather than a submodule.

The battery modules 2115 can each include a plurality of battery cells 2120. The battery modules 2115 can be disposed within the housing 2205 of the battery pack 2110. The battery modules 2115 can include battery cells 2120 that are cylindrical cells or prismatic cells, for example. The battery module 2115 can operate as a modular unit of battery cells 2120. For example, a battery module 2115 can collect current or electrical power from the battery cells 2120 that are included in the battery module 2115 and can provide the current or electrical power as output from the battery pack 2110. The battery pack 2110 can include any number of battery modules 2115. For example, the battery pack can have one, two, three, four, five, six, seven, eight, nine, ten, eleven, twelve or other number of battery modules 2115 disposed in the housing 2205. It should also be noted that each battery module 2115 may include a top submodule 2220 and a bottom submodule 2225, possibly with a thermal component 2215 in between the top submodule 2220 and the bottom submodule 2225. The battery pack 2110 can include or define a plurality of areas for positioning of the battery module 2115 and/or cells 2120. The battery modules 2115 can be square, rectangular, circular, triangular, symmetrical, or asymmetrical. In some examples, battery modules 2115 may be different shapes, such that some battery modules 2115 are rectangular but other battery modules 2115 are square shaped, among other possibilities. The battery module 2115 can include or define a plurality of slots, holders, or containers for a plurality of battery cells 2120. It should be noted the illustrations and descriptions herein are provided for example purposes and should not be interpreted as limiting. For example, the battery cells 2120 can be inserted in the battery pack 2110 without battery modules 2225 and 2230. The battery cells 2120 can be disposed in the battery pack 2110 in a cell-to-pack configuration without modules 2225 and 2230, among other possibilities.

Battery cells 2120 have a variety of form factors, shapes, or sizes. For example, battery cells 2120 can have a cylindrical, rectangular, square, cubic, flat, pouch, elongated or prismatic form factor. As depicted in FIG. 22C, for example, the battery cell 2120 can be cylindrical. As depicted in FIG. 22D, for example, the battery cell 2120 can be prismatic. As depicted in FIG. 22E, for example, the battery cell 2120 can include a pouch form factor. Battery cells 2120 can be assembled, for example, by inserting a winded or stacked electrode roll (e.g., a jelly roll) including electrolyte material into at least one battery cell housing 2230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 2120 can include an electrolyte layer where the electrolyte layer can be or include solid electrolyte material that can conduct ions.

For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 2120. The housing 2230 can be of various shapes, including cylindrical or rectangular, for example. Electrical connections can be made between the electrolyte material and components of the battery cell 2120. For example, electrical connections to the electrodes with at least some of the electrolyte material can be formed at two points or areas of the battery cell 2120, for example to form a first polarity terminal 2235 (e.g., a positive or anode terminal) and a second polarity terminal 2240 (e.g., a negative or cathode terminal). The polarity terminals can be made from electrically conductive materials to carry electrical current from the battery cell 2120 to an electrical load, such as a component or system of the electric vehicle 2105.

For example, the battery cell 2120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 2120 to separate the anode and cathode from each other and to facilitate transfer of lithium ions between the anode and cathode. It should be noted that battery cell 2120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S-P_2S_5$, $Li_2S-B_2S_3$, $SnS-P_2S_5$, $Li_2S-SiS_2$, $Li_2S-P_2S_5$, $Li_2S-GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 2120 can be included in battery modules 2115 or battery packs 2110 to power components of the electric vehicle 2105. The battery cell housing 2230 can be disposed in the battery module 2115, the battery pack 2110, or a battery array installed in the electric vehicle 2105. The housing 2230 can be of any shape, such as cylindrical with a circular (e.g., as depicted in FIG. 22C, among others), elliptical, or ovular base, among others. The shape of the housing 2230 can also be prismatic with a polygonal base, as shown in FIG. 22D, among others. As shown in FIG. 22E, among others, the housing 2230 can include a pouch form factor. The housing 2230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 2230 of the battery cell 2120 can include one or more materials with various electrical conductivity or thermal conductivity, or a combination thereof. The electrically conductive and thermally conductive material for the housing 2230 of the battery cell 2120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 2230 of the battery cell 2120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 2230 of the battery cell 2120 is prismatic (e.g., as depicted in FIG. 22D, among others) or cylindrical (e.g., as depicted in FIG. 22C, among others), the housing 2230 can include a rigid or semi-rigid material such that the housing 2230 is rigid or semi-rigid (e.g., not easily deformed or manipulated into another shape or form factor). In examples where the housing 2230 includes a pouch form factor (e.g., as depicted in FIG. 22E, among others), the housing 2230 can include a flexible, malleable, or non-rigid material such that the housing 2230 can be bent, deformed, manipulated into another form factor or shape.

The battery cell 2120 can include at least one anode layer 2245, which can be disposed within the cavity 2250 defined by the housing 2230. The anode layer 2245 can include a first redox potential. The anode layer 2245 can receive electrical current into the battery cell 2120 and output electrons during the operation of the battery cell 2120 (e.g., charging or discharging of the battery cell 2120). The anode layer 2245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 2120 can include at least one cathode layer 2255 (e.g., a composite cathode layer compound cathode layer, a compound cathode, a composite cathode, or a cathode). The cathode layer 2255 can include a second redox potential that can be different than the first redox potential of the anode layer 2245. The cathode layer 2255 can be disposed within the cavity 2250. The cathode layer 2255 can output electrical current out from the battery cell 2120 and can receive electrons during the discharging of the battery cell 2120. The cathode layer 2255 can also release lithium ions during the discharging of the battery cell 2120. Conversely, the cathode layer 2255 can receive electrical current into the battery cell 2120 and can output electrons during the charging of the battery cell 2120. The cathode layer 2255 can receive lithium ions during the charging of the battery cell 2120.

The battery cell 2120 can include an electrolyte layer 2260 disposed within the cavity 2250. The electrolyte layer 2260 can be arranged between the anode layer 2245 and the cathode layer 2255 to separate the anode layer 2245 and the cathode layer 2255. The electrolyte layer 2260 can help transfer ions between the anode layer 2245 and the cathode layer 2255. The electrolyte layer 2260 can transfer $Li^+$ cations from the anode layer 2245 to the cathode layer 2255 during the discharge operation of the battery cell 2120. The electrolyte layer 2260 can transfer lithium ions from the cathode layer 2255 to the anode layer 2245 during the charge operation of the battery cell 2120.

The redox potential of layers (e.g., the first redox potential of the anode layer 2245 or the second redox potential of the cathode layer 2255) can vary based on a chemistry of the respective layer or a chemistry of the battery cell 2120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 2255). Lithium-ion batteries can include a graphite chemistry, a silicon-graphite chemistry, or a lithium metal chemistry for the anode layer (e.g., the anode layer 2245).

For example, lithium-ion batteries can include an olivine phosphate ($LiMPO_4$, M=Fe and/or Co and/or Mn and/or Ni)) chemistry, LISICON or NASICON Phosphates ($Li_3M_2$ $(PO_4)_3$ and $LiMPO_4O_x$, M=Ti, V, Mn, Cr, and Zr), for example Lithium iron phosphate (LFP), Lithium iron manganese phosphate (LMFP), a layered oxides ($LiMO_2$, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 2255). Lithium-ion batteries can include a graphite chemistry, a silicon-graphite chemistry, or a lithium metal chemistry for the anode layer (e.g., the anode layer 2245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 2255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 2245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 2260 can include or be made of a liquid electrolyte material. For example, the electrolyte layer 2260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 2260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 2260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 2260 includes a liquid electrolyte material, the electrolyte layer 2260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 2260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 2260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 2260 from greater than 0 M to about 21.5 M.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a plate comprising an opening;
a clamp to couple a battery cell with the plate, wherein a terminal of the battery cell is at least partially exposed through the opening;
a spring positioned with the clamp and the plate, the spring causes the clamp to align the battery cell with a current collector; and
a pin to pass through the plate and the spring, the pin to couple the clamp with the plate.

2. The apparatus of claim 1, comprising:
a triplet of clamps comprising the clamp;
wherein the triplet of clamps is configured to clamp two battery cells comprising the battery cell with the current collector.

3. The apparatus of claim 1, comprising:
a triplet of clamps comprising, a first clamp of the triplet to clamp a positive terminal of a first battery cell of a plurality of battery cells with a first positive current collector, a second clamp of the triplet to clamp a negative terminal of the first battery cell and a negative terminal of a second battery cell of the plurality of battery cells with a negative current collector, and a third clamp of the triplet to clamp a positive terminal of the second battery cell with a second positive current collector.

4. The apparatus of claim 1, wherein the spring contacts the plate and the clamp.

5. The apparatus of claim 1, wherein the spring is a first spring, the apparatus further comprising:
a second spring;
wherein the first spring and the second spring bias the clamp to align the battery cell with the current collector.

6. The apparatus of claim 1, wherein the spring is a first spring, the apparatus further comprising:
a second spring;
wherein the first spring and the second spring are on opposing sides of the opening.

7. The apparatus of claim 1, wherein the spring is a first spring, the apparatus further comprising:
a second spring;
wherein the clamp is configured to receive the battery cell between the first spring and the second spring.

8. The apparatus of claim 1, comprising a laser, wherein the laser is configured to:
move to a first portion of the battery cell; and
micro-weld a line segment on the portion of the battery cell.

9. The apparatus of claim 1, comprising a laser, wherein the laser is configured to:
move to a first portion of the battery cell;
micro-weld a first line segment on the first portion of the battery cell;
move to a second portion of the battery cell or a second battery cell; and
in response to moving to the second portion, micro-weld a second line segment on the second portion of the battery cell or the second battery cell.

10. The apparatus of claim 1, comprising a laser, wherein the laser is configured to:
change from an inactive state to an active state;
micro-weld a first line segment on a first portion of the battery cell;
change, in response to micro-welding the first line segment, from the active state to the inactive state;
move to a second portion of the battery cell or a second battery cell;
change, in response to moving to the second portion, from the inactive state to the active state; and
micro-weld a second line segment on the second portion of the battery cell or on the second battery cell.

11. A method, comprising:
providing a plate comprising an opening;
providing a clamp to couple a battery cell with the plate, wherein a terminal of the battery cell is at least partially exposed with the opening;
causing, with a spring positioned with the clamp and the plate, the clamp to align the battery cell with a current collector; and
passing a pin to couple the clamp with the plate.

12. The method of claim 11, comprising:
biasing a triplet of clamps comprising the clamp, the triplet clamping two battery cells comprising the battery cell with the current collector.

13. The method of claim 11, comprising:
biasing a triplet of clamps, the biasing causing a first clamp of the triplet to clamp a positive terminal of a first battery cell of the plurality of battery cells with a first positive current collector, a second clamp of the triplet to clamp a negative terminal of the first battery cell and a negative terminal of a second battery cell of the plurality of battery cells with a negative current collector, and a third clamp of the triplet to clamp a positive terminal of the second battery cell with a second positive current collector.

14. The method of claim 11, comprising:
causing the clamp to align the battery cell with the current collector with two springs comprising the spring.

15. The method of claim 11, comprising:
biasing the clamp away from the plate by two springs comprising the spring on opposing sides of the opening.

16. An apparatus comprising:
a plurality of plates comprising an opening and coupled with a board;
a clamp to couple a battery cell to at least one of the plurality of plates such that a terminal of the battery cell is at least partially exposed through the opening;
wherein the clamp clamps the battery cell to a current collector; and
a pin to pass through a plate of the plurality of plates and a spring between the clamp and the plate, the pin to couple the clamp with the plate.

17. The apparatus of claim 16, wherein each of the plurality of plates is connected with the board across an opening and adjacent to another plate of the plurality of plates.

18. The apparatus of claim 16, comprising:
the spring to bias the clamp to clamp the battery cell with the current collector.

* * * * *